(12) United States Patent
Soryal

(10) Patent No.: US 12,317,095 B2
(45) Date of Patent: May 27, 2025

(54) VIRTUAL PRIVATE CELLULAR NETWORK AS A SERVICE

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 461 days.

(21) Appl. No.: 17/745,988

(22) Filed: May 17, 2022

(65) Prior Publication Data

US 2023/0379724 A1    Nov. 23, 2023

(51) Int. Cl.
*H04W 16/18* (2009.01)
*H04W 16/26* (2009.01)

(52) U.S. Cl.
CPC ........... *H04W 16/18* (2013.01); *H04W 16/26* (2013.01)

(58) Field of Classification Search
CPC ....... H04M 7/1225–1235; H04M 2207/35–45; H04W 16/18; H04W 16/26; H04W 84/02–16
See application file for complete search history.

(56) References Cited

U.S. PATENT DOCUMENTS

| | | | |
|---|---|---|---|
| 2003/0139180 A1 | 7/2003 | McIntosh et al. | |
| 2010/0330955 A1 | 12/2010 | Chan et al. | |
| 2012/0127974 A1* | 5/2012 | Doppler | H04W 76/12 370/338 |
| 2020/0008007 A1 | 1/2020 | Belghoul et al. | |
| 2020/0021997 A1 | 1/2020 | Shoshan et al. | |
| 2021/0195406 A1 | 6/2021 | Gundavelli et al. | |
| 2021/0282230 A1 | 9/2021 | Nelson | |
| 2021/0385740 A1 | 12/2021 | Srivastava et al. | |
| 2022/0070623 A1 | 3/2022 | Nelson et al. | |
| 2022/0086692 A1 | 3/2022 | Nelson | |
| 2022/0109704 A1 | 4/2022 | Nelson et al. | |

OTHER PUBLICATIONS https://www.merriam-webster.com/dictionary/direct printed on Sep. 28, 2023 (Year: 2023).*

(Continued)

*Primary Examiner* — Ronald Eisner
(74) *Attorney, Agent, or Firm* — Guntin & Gust, PLC; Matthew Tropper

(57) ABSTRACT

Aspects of the subject disclosure may include, for example, identifying a private cellular network that includes a group of wireless communication devices and a private cellular service area in which the group of wireless communication devices may receive a private cellular network service. A radio access network (RAN) of a group of RANs in communication with a mobile core network of a public mobile cellular network is configured to provide a wireless coverage area that contains an entirety of the private cellular service area. A virtual machine is configured as a private cellular network controller that is adapted to provide the private cellular network service to wireless communication devices of the private cellular network group operating within the service area. The private cellular network service does not utilize the mobile core network. Other embodiments are disclosed.

20 Claims, 11 Drawing Sheets

(56) References Cited

OTHER PUBLICATIONS https://dictionary.cambridge.org/dictionary/english/configure?q=configuring printed on Sep. 28, 2023 (Year: 2023).*
https://www.vocabulary.com/dictionary/instantiate printed on Sep. 28, 2023 (Year: 2023).*
Kappos 1351 OG 212 (Feb. 23, 2010). (Year: 2010).*
Merriam-Webster Online Dictionary definition from https://www.merriam-webster.com/dictionary/direct printed on Sep. 28, 2023 (Year: 2023).*
Cambridge Advanced Learner's Dictionary https://dictionary.cambridge.org/dictionary/english/configure?q=configuring printed on Sep. 28, 2023 (Year: 2023).*
"How to use your smartphone as a Wi-Fi repeater", Tech & Community; NextPit, printed May 14, 2022, 9 pages.
"Private 5G Mobile Networks", AWS Private 5G, Amazon Web Services, printed May 10, 2022, 7 pages.

* cited by examiner

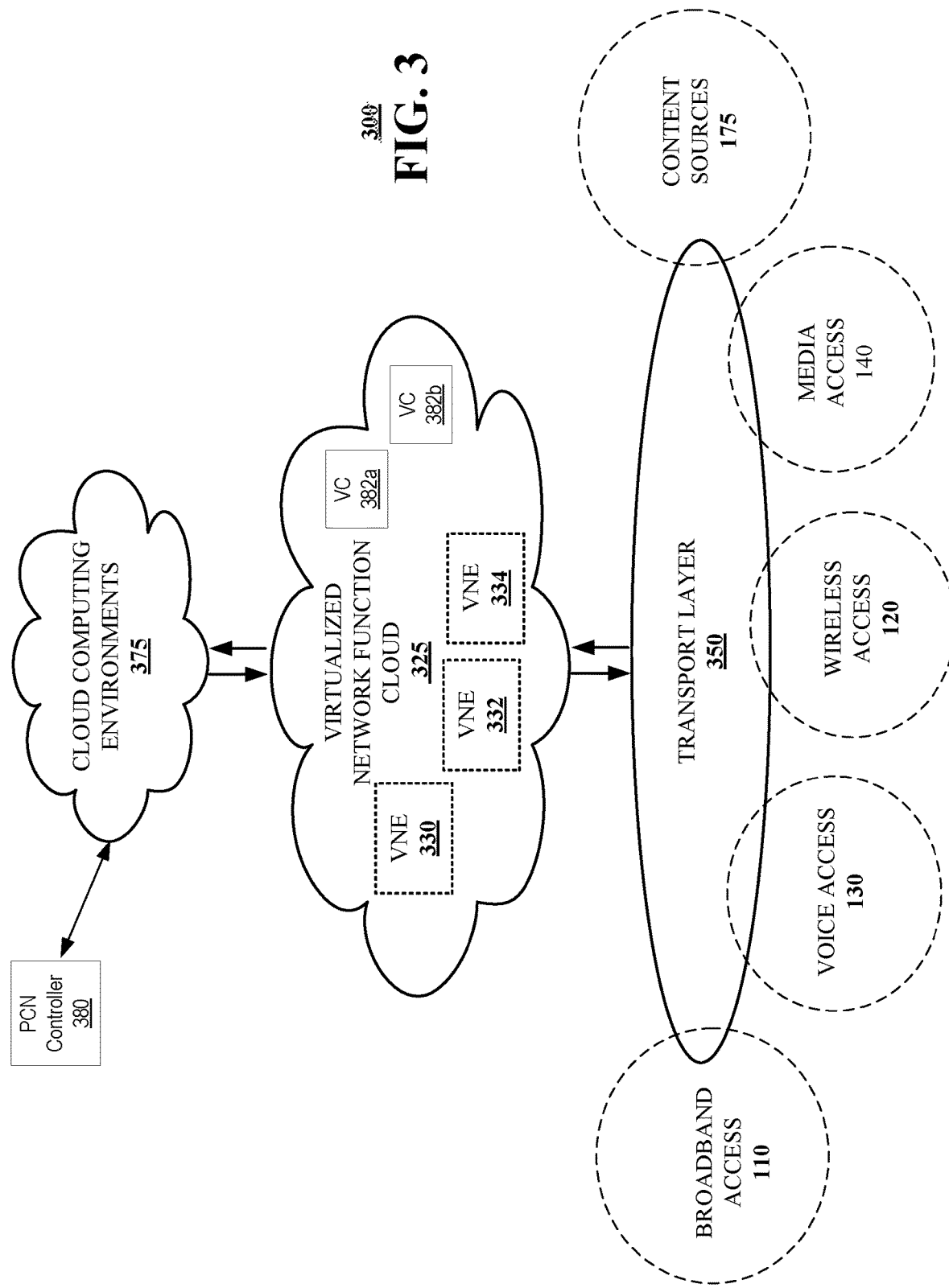

VIRTUAL PRIVATE CELLULAR NETWORK AS A SERVICE

FIELD OF THE DISCLOSURE

The subject disclosure relates to a virtual private cellular network as a service.

BACKGROUND

Some facilities, such as hospitals, factories, warehouses, and perhaps other campus environments, may prefer that mobile voice calls and/or messages between facility occupants and/or equipment be implemented locally, without necessarily leaving the facility. Such local communication accommodations may address at least some security concerns, while offering other advantages such as low latency. At least some mobile communication applications, such as robots that utilize artificial intelligence (AI), cannot afford delay that might be associated with typical mobile cellular services that manage such communications through a mobile service provider core network, typically hosted at a data center in some remote location.

Some communication service providers offer a so-called private cellular network (PCN) service to small, medium and large enterprises and/or campuses to enhance cellular service within the enterprise/campus environments. These services utilize a broadband radio service (CBRS) providing access to shared radio spectrum, allowing at least some cellular communications to be handled locally. Provisioning of such PCN systems requires that customer purchase, install and operate at least some hardware equipment on site, such as an antenna, a baseband unit (BBU) controller and a multi-operator core networks (MOCN) gateway. By way of example, a private 5G service is offered by Amazon Web Services® (AWS®) computer services, which requires that customers purchase small cell radio base stations and servers.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
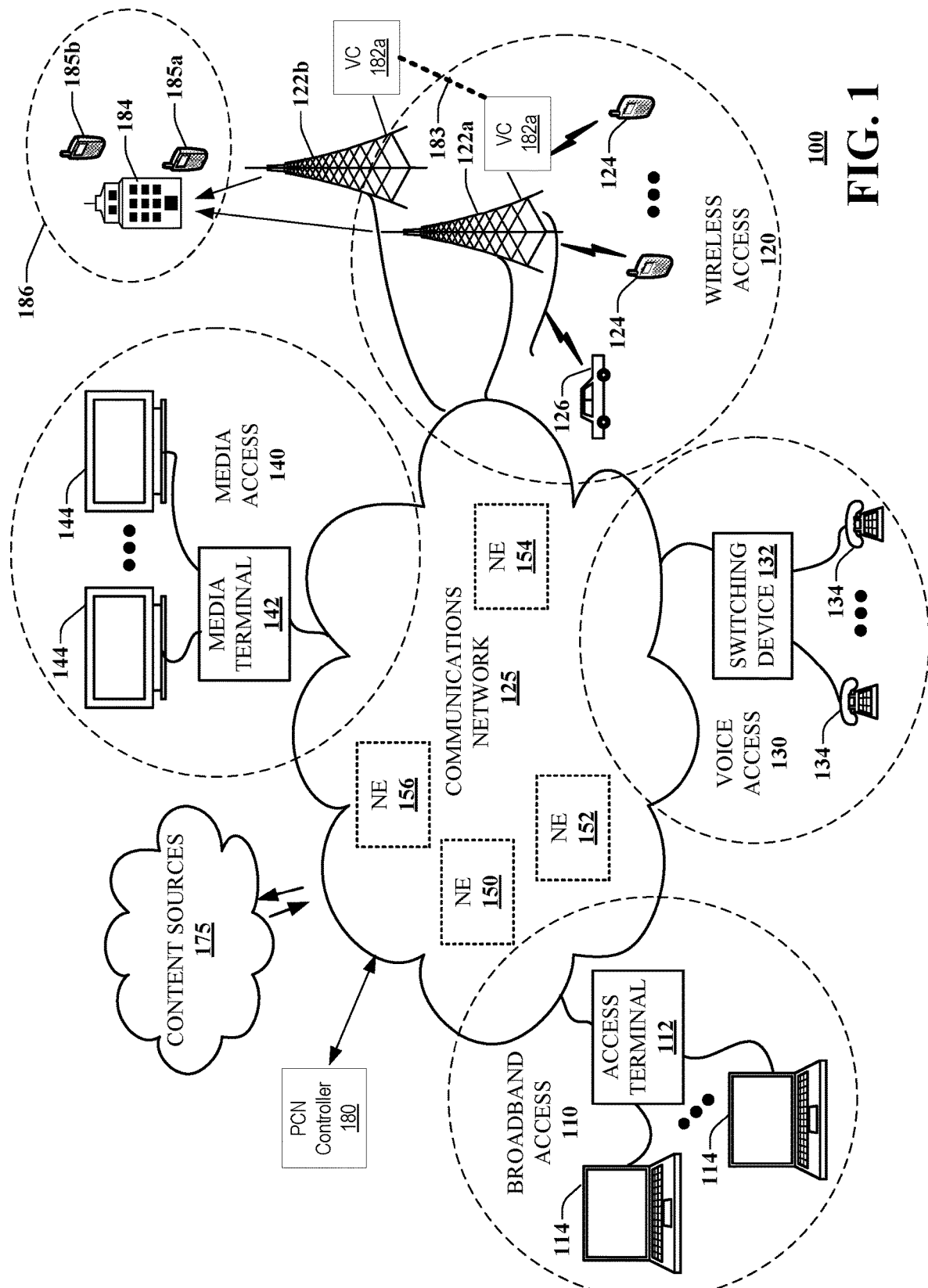
FIG. 1 is a block diagram illustrating an exemplary, non-limiting embodiment of a communications network in accordance with various aspects described herein.

The subject disclosure describes, among other things, illustrative embodiments for configuring one or more antennas, radios, wireless access points and/or base stations of a public mobile cellular network to provide dedicated wireless coverage to a private service area and for instantiating one or more controllers in communication with the one or more antennas. The controllers may include virtual controller(s) that are adapted to provide private cellular network (PCN) services to authorized wireless communication devices operating within a PCN service area without utilizing core network resources of a public mobile cellular network. Other embodiments are described in the subject disclosure.

One or more aspects of the subject disclosure include a process, comprising: associating, by a processing system including a processor, a number of wireless communication devices with a PCN group and identifying, by the processing system, a first service area to receive a PCN service. A first radio access network (RAN) of a group of RANs in communication with a mobility core network of a publicly accessible mobile cellular network is directed, by the processing system, to obtain a first directed RAN that provides a first wireless coverage area overlapping at least a portion of the first service. A first virtual machine is configured, by the processing system, as a first PCN controller, wherein the first PCN controller is adapted to provide the PCN service, via the first directed RAN, to a first wireless communication device of the PCN group operating within the first service area, wherein the private cellular network service does not utilize the mobile core network.

One or more aspects of the subject disclosure include a system, comprising: a processing system including a processor; and a memory that stores executable instructions that, when executed by the processing system, facilitate performance of operations. The operations include associating a number of wireless communication devices with a PCN group and identifying a first service area to receive a PCN service. The operations further include configuring a first radio access network (RAN) segment of a plurality of RAN segments in communication with a mobile core network of a public mobile cellular network to obtain a first configured RAN segment that provides a first wireless coverage area overlapping at least a portion of the first service area. The operations further include instantiating a first virtual machine as a first PCN controller, wherein the first PCN controller is adapted to provide the PCN service, via the first configured RAN segment, to a first wireless communication device of the PCN group operating within the first service area. The private cellular network service does not utilize the mobile core network.

One or more aspects of the subject disclosure include a non-transitory, machine-readable medium, comprising executable instructions that, when executed by a processing system including a processor, facilitate performance of operations. The operations include identifying a PCN group including a number of wireless communication devices and identifying a service area to receive a PCN service. The operations further include configuring a radio access network (RAN) segment of a plurality of RAN segments in communication with a mobile core network of a mobile cellular network to obtain a configured RAN segment that provides a wireless coverage area containing an entirety of the service area. The operations further include configuring a virtual machine as a PCN controller, wherein the PCN controller is adapted to provide the PCN service, via the configured RAN segment, to a group of communication devices of the PCN group operating within the service area. The private cellular network service does not utilize the mobile core network.

As mentioned above, currently available PCN systems require that a customer purchase and host dedicated equipment, such as small cell radio base stations and servers. In addition to purchasing the equipment, the customer must provide dedicated space, power, communications connectivity, e.g., an Internet connection, and perhaps cooling and/or environmental protection for the equipment. At least some level of expertise would be required at the customer site for installation, configuration, and/or maintenance of the equipment. In view of any likely technology enhancement and/or improvements, at least some of the equipment may require periodic replacement and/or upgrades. All this places a heavy burden on the customer.

The techniques disclosed herein, by way of processes, systems and/or software, alleviate many of the aforementioned drawbacks associated with implementing a PCN. Namely, a PCN service may be deployed at a customer enterprise and/or campus without requiring a significant investment in equipment. In at least some embodiments, the PCN service may be deployed without requiring an installation of any dedicated equipment at the customer site. The PCN may be supported, at least in part, with existing mobile network operator equipment, e.g., existing cell towers, antennas and/or radios, supplemented by PCN controllers configured and/or otherwise provided on an as needed basis. The PCN controllers may be located at one or more facilities controlled by the mobile network operator, e.g., at a cell tower and/or base station, and/or at a data center. Alternatively or in addition, at least some of the equipment, e.g., the PCN controllers, may be provided by virtual machines (VM) that provide an elastic capacity that may be initiated, increased, reduced and/or terminated on an as-needed basis. In at least some embodiments, the VMs may be hosted in a cloud environment. This configuration minimizes and/or altogether alleviates any burden on the customer to host PCN equipment on site. Moreover, to the extent any upgrades and/or enhancements are required, they may be implemented via modification of the VMs, e.g., in the cloud.

Referring now to FIG. 1, a block diagram is shown illustrating an example, non-limiting embodiment of a system 100 in accordance with various aspects described herein. For example, the system 100 can facilitate in whole or in part configuring one or more RAN segments of a public mobile cellular network including multiple RAN segments, to provide dedicated wireless coverage to a private service area and for instantiating one or more virtual controllers in communication with the one or more RAN segments that may include one or more antennas, a radio transmitter, a radio receiver, a radio transceiver, RF signal conditioning equipment, RF conduits, e.g., cables, waveguides and/or fiber. The virtual controller(s) are adapted to provide PCN service to authorized wireless communication devices operating within the private service area without utilizing core network resources of the public mobile cellular network. In particular, a communications network 125 is presented for providing broadband access 110 to a plurality of data terminals 114 via an access terminal 112, a wireless access 120 to a plurality of mobile devices 124 and a vehicle 126 via a base station and/or one or more base stations or access points 122a, 122b, generally 122, a voice access 130 to a plurality of telephony devices 134, via a switching device 132 and/or a media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, one or more of the base stations or access points 122 may include a 4G, 5G, or higher generation base station, e.g., eNB, gNB, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the system 100 may be adapted to provide PCN services within a corresponding PCN service area 186. The system 100 may include one or more PCN controllers 182a, 182b, generally 182, in communication with the one or more one or more of the base stations or access points 122. For example, a first PCN controller 182a is in communication with the first base station 122a while a second PCN controller 182b is in communication with the second base station 122b. Antennas of one or both of the base stations 122 may be directed to provide wireless coverage at the corresponding customer service area 186, which encompasses at least a portion of a customer premises 184. The PCN controllers 182 may be adapted to support the PCN services to authorized wireless communication devices located within the corresponding customer service area 186. Accordingly, wireless communication devices 185a, 185b, generally 185, located within the area of wireless coverage may access the PCN services provided that the wireless communication devices 185 have been authorized to access such services.

One or more of the PCN controllers 182 may be provided as configurable hardware, e.g., as one or more configurable servers. In some embodiments, at least some of the configurable hardware may be collocated with one or more of the base stations 122. Alternatively or in addition, at least some of the configurable hardware may be provided in a nearby equipment facility, e.g., an equipment cabinet and/or data center. In at least some embodiments, one or more of the PCN controllers 182 may be implanted using virtual machines. The virtual machines may be hosted on hardware devices, e.g., one or more hosting servers, which may be collocated with one or more of the base stations 122 and/or provided in a nearby equipment facility, e.g., an equipment cabinet and/or data center.

In at least some embodiments, one or more of the PCN controllers 182 may be provided as cloud resources hosted in a cloud environment. Examples of cloud computing providers and/or resources include, without limitation, Amazon's AWS®, Microsoft's Azure®, Google Cloud, IBM® cloud services, Oracle Cloud®, Rackspace®, VMWare®. Cloud computing resources may be implemented according to one or more of a service (SaaS) model, a platform as a service (PaaS) model, and/or as an infrastructure as a service (IaaS) model, e.g., adapted to support one or more cellular services, such as voice calling, messaging, file transfer, streaming media, and mobility.

The example PCN controllers 182 are in communication with each other via at least one communication link 183. The communication link 183 may include a dedicated link that is separate from traditional mobile cellular links as may also be provided between base stations and/or core network portions of the mobile network operator systems. In at least some embodiments, the communication link 183 is isolated from and/or otherwise not in communication with any core network portions. For example, the communication link 183 may be dedicated for PCN related communications, being implemented in a manner adapted to provide low latency, to avoid network traffic congestion as may be experienced on a public portion of the mobile network operator system and/or to ensure secure communications. For example, the communication link 183 may employ secure measures, such as end-to-end encryption, e.g., employing a secure tunnel, e.g., IP security (IPSEC) tunnel and/or a virtual private network between the PCN controllers 182. Application of an IPSEC tunnel to the communication link 183 may provide one or more of data authentication, integrity and/or confidentiality, e.g., by encrypting, decrypting and/or authenticating data packets exchanged thereon.

In at least some embodiments, the system 100 includes a PCN controller 180. The PCN controller 180 may be adapted to facilitate installation, adaptation, operation and/or maintenance of a PCN service provided to the corresponding customer service area 186. For example, the PCN controller 180 may receive a request for PCN service, determine metes and bounds of a corresponding customer service area 186 and/or whether the service area may include one or more architectural structures, such as buildings, tunnels, underground areas, and the like.

The PCN controller 180 may have access to mobile network operator records that may include equipment records, and/or equipment location records, network architectural records, operational capabilities, usage statistics, planned maintenance, upgrades, new equipment rollouts, and so on. Without limitation, the mobile network operator records may identify one or more of currently installed and/or planned installations of cell towers and/or wireless access points. The architectural records may include information related to RAN segments, such as antenna types, antenna and/or transceiver operating frequency bands, antenna coverage diagrams, whether the antennas are directional and/or reconfigurable, modulation types, communication protocols, usage parameters, overhead parameters, physical access restrictions, reliability metrics, and so on. In at least some embodiments, the PCN controller 180 may have access to other information, such as maps, satellite imagery, environmental imagery, e.g., from Google's Street View®, and the like.

The PCN controller 180 may utilize available information, such as the mobile network operator records, to identify existing mobile network infrastructure in view of the PCN service request. For example, the PCN controller 180 may identify cell towers and/or wireless access points within range of the customer service area 186. In at least some embodiments, the PCN controller 180 may identify a group of cellular antenna towers and/or wireless access points that collectively overlap an entirety, or as close to an entirety, of the corresponding customer service area 186. The PCN controller 180 may access a cloud service to configure, e.g., "spin up" and/or otherwise instantiate one or more of the PCN controllers 182 as may be appropriate for the requested PCN service, e.g., having one PCN controller 182 for each cellular antenna and/or wireless access point. To the extent multiple PCN controllers 182 are configured to support the requested PCN service, the PCN controller 180 may facilitate interconnection of the virtual PCN controllers, e.g., including any security measures as may be employed.

The PCN infrastructure, including a collection of configured RAN segments, e.g., base stations and/or access points 122, their corresponding PCN controllers 182 and any interconnecting communication link 183, may be adapted to collectively provide the PCN service to authorized wireless communication devices operating within the corresponding customer service area 186. In at least some embodiments, the PCN controller 182 may monitor operation of the PCN infrastructure, e.g., tracking usage statistics, signal strengths, quality of service (QoS), dropped calls, stalled and/or incomplete file transfers and/or streaming media sessions, and the like. The PCN controller 182 may identify maintenance issues, recommend enhancements and/or improvements, e.g., based on monitored performance, and so on. In at least some embodiments, the PCN controller 182 may be accessed and/or otherwise controlled remotely, e.g., by a portal. Operation and maintenance (O&M) of the PCN infrastructure may be performed at least in part, remotely via the portal.

Figure 2A:
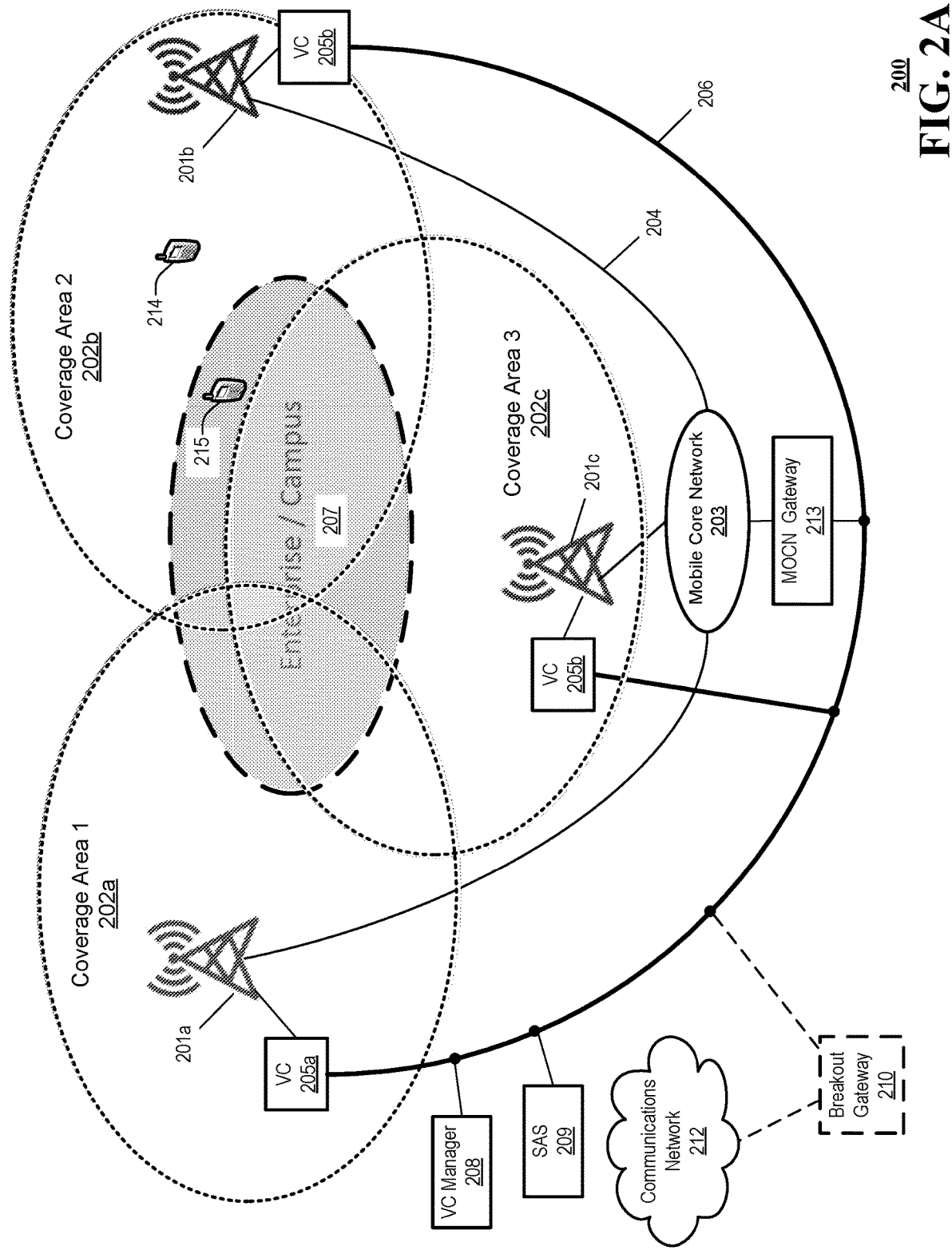
FIG. 2A is a block diagram illustrating an example, non-limiting embodiment of a virtual private cellular network (PCN) system functioning within the communication network of FIG. 1 in accordance with various aspects described herein.

FIG. 2A is a block diagram illustrating an example, non-limiting embodiment of a virtual PCN system 200 functioning within the communication network of FIG. 1 in accordance with various aspects described herein. The virtual PCN system 200 is adapted to provide PCN service to authorized wireless communication devices operating with a PCN service area 207. In at least some embodiments, user equipment (UE) of the PCN service may require specific identification features, e.g., a specific SIM. Some examples of UE devices may include, without limitation, mobile phones, tablet devices, laptop computers, virtual reality and/or augmented reality devices, e.g., headgear, gaming consoles, game controllers, manufacturing equipment, construction equipment, vehicles, e.g., cars and/or drones, robots, and the like. If a user requires access to secure communications and/or low-latency service, then the user may employ UE outfitted with a SIM that has been authorized to access the PCN service. In at least some examples, the PCN service may appear similar to WiFi calling, but much faster, e.g., providing the UE with access to full-fledged cell phone services as may be otherwise available through an 3G-core network, a 4G or LTE-core network and/or a 5G-core network, and so on.

The example virtual PCN system 200 utilizes three mobile network cells to achieve complete wireless coverage of the PCN service area 207, although it is envisioned that coverage may be provide by as few as one cell, or perhaps more than two or three cells. According to the illustrative example, a first cell includes a first RAN segment 201a providing wireless communications within a first coverage area 202a. Likewise, a second and third RAN segments 201b, 201c, provide respective wireless communications within second and third coverage areas 202b, 202c. The RAN segments 201a, 201b, 201c, generally 201, may be geographically dispersed to extend public cellular communication coverage. According to the illustrative example, the coverage areas 202a, 202b, 202c, generally 202, overlap at least a portion, and preferably an entirety of the PCN service area 207. To the extent complete coverage were not possible with currently deployed RAN segments 201 and/or coverage areas 202, existing RAN segments, e.g., antennas and/or radio transceivers may be redirected and/or otherwise reconfigured to extend wireless coverage to any uncovered areas of the PCN service area 207. Alternatively or in addition, one or more repeaters may be configured and/or otherwise deployed to extend wireless coverage to any uncovered areas of the PCN service area 207.

At least some of the RAN segments 201 are in communication with a mobile core network 203 and collectively adapted to provide cellular network services to user equipment of subscribers, including members of the general public, e.g., roaming users. Such public cellular service may be provided according to an extent of the coverage areas 202. Any of the wireless services disclosed herein, including public and/or PCN, may include an of the one or more generally known and/or deployed mobile services, e.g., according to standards of the $3^{rd}$ Generation Partnership Project (3GPP) such as 3G, Long Term Evolution (LTE), 4G, 5G, and envisioned extension of such services, e.g., including 6G and beyond. It is envisioned that any PCN services may be compatible with such standardized services, such that user equipment adapted for user of any one or more of the standard formats may be supported by the PCN services, without requiring special modifications, other than perhaps incorporating an authorization device, e.g., a SIM or UICC.

The first RAN segment 201a is in communication with a first virtual PCN controller 205a. Likewise, the second and third RAN segments 201b, 201c are in respective communication with second and third virtual PCN controllers 205b, 205c. The virtual controllers (VC) 205a, 205b, 205c, generally 205, are in further communication with each other via a virtual controller communication link 206. The VCs 205 are adapted to provide PCN service to authorized wireless communication devices operating within the private service area without utilizing core network resources of the public mobile cellular network for signaling and/or messaging of the PCN service. The RAN segments 201a, 201b, 201c, generally 201, may have been designed, located and/or otherwise provisioned according to an architecture of the public mobile cellular network, and represent existing infrastructure of opportunity for a provisioning of the PCN services described herein. It is understood that the RAN segments 201 may be geographically separate from any particular PCN service area, and operated and maintained by the mobile network operator.

The VCs 205 and the virtual controller communication link 206 may be collectively referred to as a virtual integrated controller (VIC) adapted to provide PCN services to the PCN service area 207. The virtual controller communication link 206 may be adapted to provide reliable and secure communications between the virtual controllers 205, including an exchange of PCN control and/or user data therebetween. In particular, the virtual controller communication link 206 supports PCN control and/or user data exchanges without directing communication exchanges through the mobile core network 203.

In at least some embodiments, the virtual PCN system 200 includes a virtual controller manager 208. In at least some embodiments, the virtual controller manager 208 may be in communication with one or more of the virtual controllers 205. For example, the virtual controller manager 208 may be in communication with the virtual controllers via the virtual controller communication link 206. Alternatively or in addition, the virtual controller manager may be communication with one or more of the virtual controllers 205 via a separate communications link, e.g., as may include the Internet and/or a mobile network operator backbone communications link 204 generally in place between the RAN segments 201 and/or the mobile core network 203.

In at least some embodiments the virtual controller manager 208 is in communication with a cloud service orchestrator (not shown). The virtual controller manager 208 may receive an indication of a request for PCN service, determine one or more parameters of a corresponding PCN service area 207, and identify and/or otherwise reconfigure existing mobile network operator resources to support wireless communications to the PCN service area 207. Alternatively or in addition, the virtual controller manager 208 may determine, define and/or otherwise facilitate configuration of virtual machines to instantiate the virtual controllers 205. It may not be necessary in at least some instances that the virtual controller manager 208 is in communication with one or more of the virtual controllers 205 and/or the virtual controller communication link 206.

Public mobile cellular network services, such as those provide to UE devices 214 of the general public operating within the collective coverage region 202, may employ wireless communications of an air interface of a radio access network (RAN), e.g., between the UE devices 214 and one or more of the RAN segments 201. Wireless communications of an air interface used by the general public generally operates in licensed frequency bands as may be available for a give mobile network operator in a particular geographic region. In at least some embodiments, at least some wireless communications of an air interface of the radio access network (RAN) may operate in an unlicensed and/or otherwise shared portion of the radio frequency spectrum. At least one such shared frequency allocation, e.g., 3550-3700 MHz band, is referred to as the citizens broadband radio service (CBRS).

When operating according to shared frequency bands, it may be necessary to coordinate an availability within a given region, for a given period of time. To this end, the illustrative virtual PCN system 200 includes a frequency coordination module 209. The frequency coordination module 209 may be in communication with one or more of the virtual controllers 205 and/or with the virtual controller manager 208. The frequency coordination module 209 may determine an indication of a location and/or extent of a requested PCN service area 207. Alternatively or in addition, the frequency coordination module 209 may determine one or more of a number of UE devices 215, a usage time and/or duration, a bandwidth, possibly the type of data and/or related application, and so on. The frequency coordination module 209 may access a remote resource, such as a spectrum usage database and/or a frequency management entity, e.g., via an Internet connection, to determine an availability of resources to support the PCN service request. Once identified, the frequency coordination module 209 ma initiate a request and/or notification to such frequency management entity regarding a reservation for and/or planned usage of a portion of the shared frequency spectrum.

The example virtual PCN system 200 includes a spectrum access system (SAS) serving as the frequency coordination module 209, which provides a cloud-based service that manages the wireless communications of devices transmitting in the CBRS band, in order to prevent harmful interference to higher priority users. It is envisioned that PCN services provided by the example virtual PCN system 200 may operate within one or more shared frequency bands, e.g., CBRS, within spectrum licensed by the mobile network operator for cellular services, and/or some combination of both licensed and unlicensed or shared frequency bands.

Although message routing according to the PCN services are described as being separate from the message routing of the public mobile cellular network, it is envisioned that at least some embodiments it may be desirable and/or necessary to facilitate external communications. For example, a UE device 215 operating within the PCN service area 207 and authorized to utilize the PCN services may attempt to initiate a call to another UE device 214 operating outside of the PCN service area 207 and/or not authorized for access to the PCN services. To the extent such external communications are allowed, the virtual PCN system may facilitate communications to the public mobile cellular network, allowing the requested call to be initiated and/or otherwise supported via the mobile core network 203. In at least some embodiments, the virtual PCN system 200 includes a gateway device in communication between the mobile core network 203 and one or more of the virtual controllers 205, e.g., via the virtual controller communication link 206. The example virtual PCN system 200 includes a multi-operator core networks (MOCN) gateway 213 that allows two spectrums, e.g., CBRS and licensed spectrum, to use the same mobile core network 203. The mobile network operators may maintain separate core networks, but share radio access elements like radios, base stations, backhaul networks and controllers, as well as spectrum.

Alternatively or in addition, the UE device 215 operating within the PCN service area 207 and authorized to utilize the PCN services may request access to external data resources, such as an external service, e.g., a streaming media service, and/or to the Internet in general. In at least some embodiments, the example virtual PCN system 200 may include a breakout gateway 210 (shown in phantom). The breakout gateway may be in communication with one or more of the virtual controllers 205, e.g., via the virtual controller communication link 206. The breakout gateway may be in further communication with another communications network 212, such as the Internet.

Figure 2B:
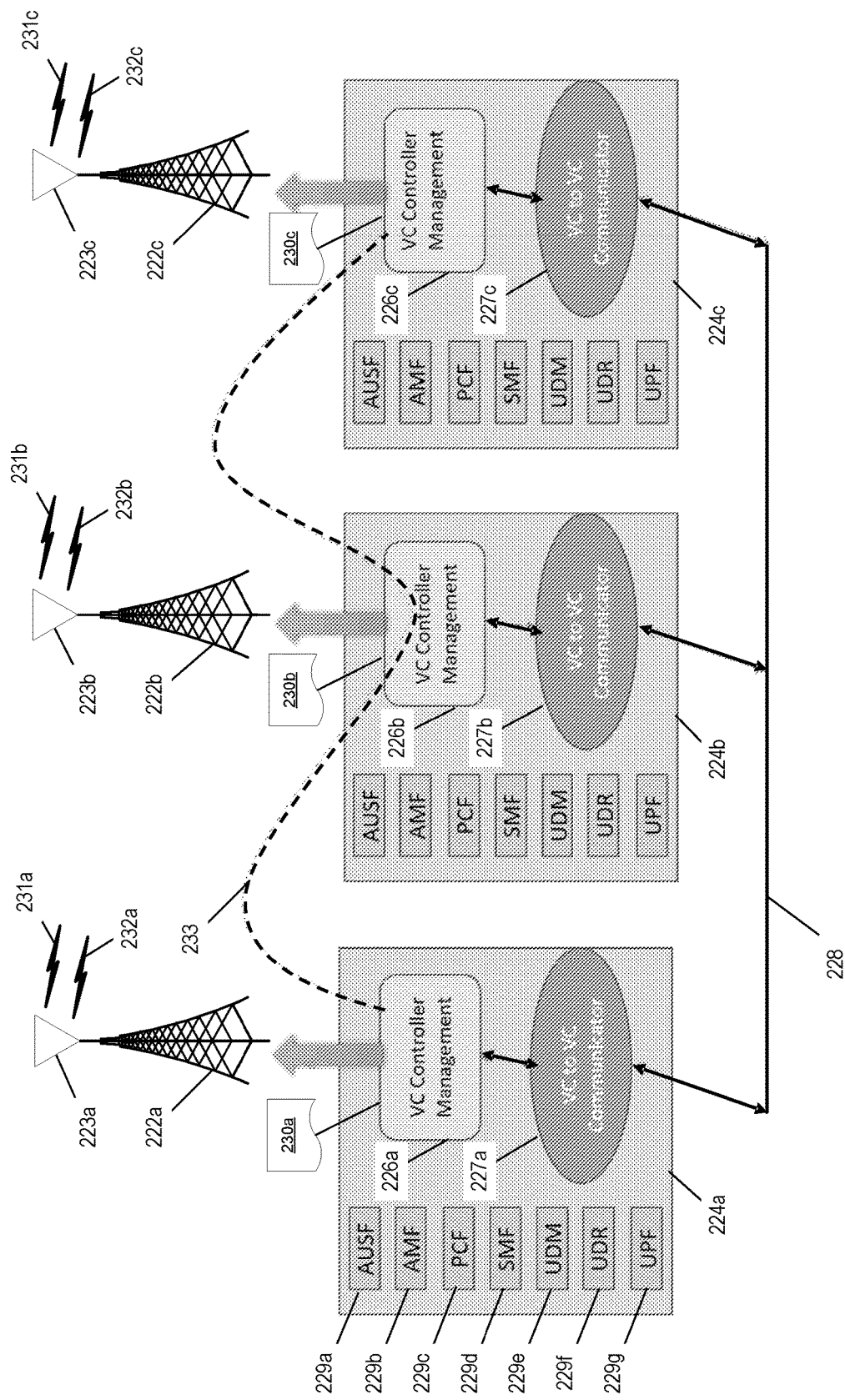
FIG. 2B is a block diagram illustrating an example, non-limiting embodiment of a virtual integrated controller system functioning within the communication network of FIG. 1, as may be used within the virtual PCN system of FIG. 2A in accordance with various aspects described herein.

FIG. 2B is a block diagram illustrating an example, non-limiting embodiment of a virtual integrated controller system 220 functioning within the communication network of FIG. 1, as may be used within the virtual PCN system 200 of FIG. 2A in accordance with various aspects described herein. The example virtual integrated controller system 220 includes a first, second and third virtual controllers 224*a*, 224*b*, 224*c*, generally 224. Each of the virtual controllers 224 is in communication with a respective one of a first, second and third wireless communication system, e.g., a RAN segment 222*a*, 222*b*, 222*c*, generally 222, that may include a cell tower, or base station. Each of the RAN segments 222, may include a respective antenna system 223*a*, 223*b*, 223*c*, generally 223, adapted to transmit and/or receive wireless signals, such as those associated with a radio access network protocol. The antennas 223 may be directional antennas that are deployed in a fixed manner, such that they provide coverage to a particular sector as may be defined in one or more of azimuth, elevation and/or height. Alternatively or in addition, the antennas 223 may be configurable, e.g., allowing an adjustment of a coverage region according to one or more of azimuth, elevation and/or height. In at least some embodiments, the antennas may be configurable according to other parameters, such as RF operational frequency range, modulation type, signal strength, and so on. One or more of the antennas 223 may be actuated, selected, steered and/or otherwise configured to provide PCN coverage to a predetermined PCN service area 207 (FIG. 2A).

The antennas may be coupled to a remote radio head (RRH) (not shown) that may be adapted to provide signal conditioning according to one or more of amplification, attenuation, filtering, and/or directional signal routing, including signal splitting and/or combining. In at least some embodiments, the signal conditioning may include adjustments of phase and/or amplitude as may be introduced to steer and/or beamform coverage provided by an array of two or more of the antennas 223. The RRH, in turn, may be connected with a baseband unit (BBU) that may be located proximal to the antenna, the antenna tower and/or at a nearby equipment cabinet or closet. The BBU may provide modulation and/or application of one or more protocol layers as may be beneficial for communicating over one or more standards, e.g., 3G, LTE, 4G, 5G. The BBU, in turn, may be connected to at least one of the virtual controllers 224.

Each of the virtual controllers 224 includes a respective virtual controller manager 236a, 236b, 236c, generally 236, and a respective virtual-controller-to-virtual-controller (VC-to-VC) communicator 237a, 237b, 237c, generally 237. Each of the virtual controllers 224 is also in communication with at least some of the other virtual controllers 224 via a virtual controller communication link 228. The virtual controller manager 226 is in communication with the RAN segment 222a, e.g., over a local and private communications link. The virtual controller manager 226 is in further communication with the VC-to VC communicator 227, which is adapted to facilitate communications between a local one of the virtual controller managers 226 and one or more of the other virtual controller managers 226, e.g., via the virtual controller communication link 228. Communications over the virtual controller communication link 228 may include, without limitation, exchanges of control data as may be associated with control messaging, e.g., for UE attachment, mobility, QoS reporting, power management, and the like. Alternatively or in addition, communications over the virtual controller communication link 228 may include user data as may be associated with utilization of a PCN service, e.g., exchanging messages with user data of voice calls, messages, file transfers, streaming media, and so on.

Each of the virtual controller managers 226 may implement respective virtual controller functionality 230a, 230b, 230c, generally 230. In at least some embodiments, the virtual controller functionality 230 may facilitate one or more of a provisioning of a PCN service to a predetermined PCN service area, an operation and maintenance of the configured PCN service to the predetermined PCN service area, and/or user data associated with UE devices, repeaters and/or extenders as may be engaged in utilization of the configured PCN service.

In at least some embodiments, the PCN service may be provided to authorized UEs located within the PCN service area. Without limitation, the PCN service may include any combination of generally recognized services as may be provided separately via public mobile networks, e.g., according to one or more of 3G, LTE, 4G, 5G services. According to the illustrative example, at least one of the virtual controllers 224 may include functionality, e.g., modules, adapted to provide one or more of the PCN functions and/or services. The example functions and/or services include, without limitation, an authentication server function (AUSF) 229a, an access and mobility management function (AMF) 229b, a policy control function (PCF) 229c, a session management function (SMF) 229d, a unified data management (UDM) function 229e, a unified data repository (UDR) function 229f and/or a user plane function (UPF) 229g. Examples of the functionality of these example functions may be found in standards, such as the standards of the 3GPP related to mobile communications.

Figure 2C:
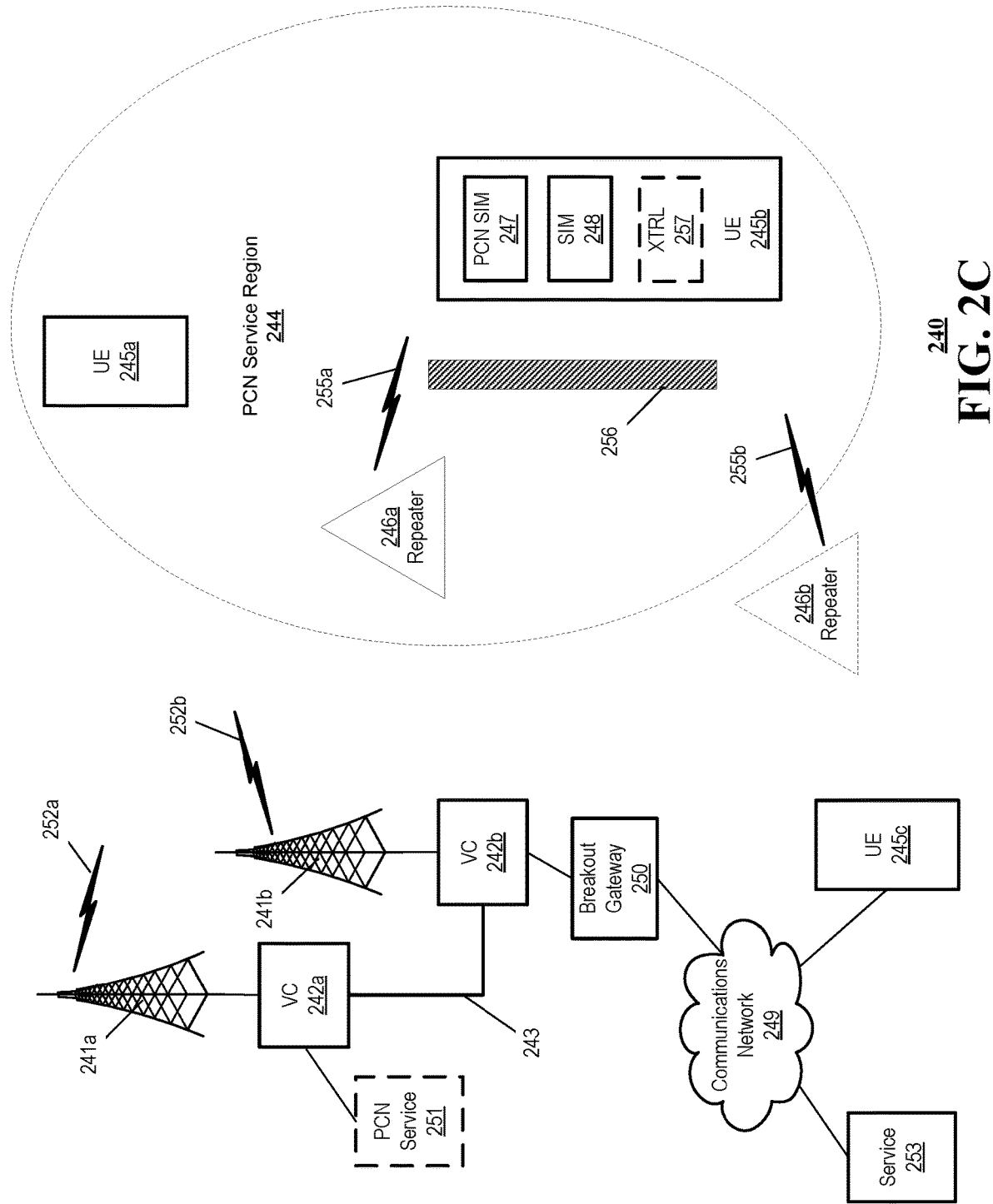
FIG. 2C is a block diagram illustrating an example, non-limiting embodiment of a virtual PCN repeater system functioning within the communication network of FIG. 1 in accordance with various aspects described herein.

FIG. 2C is a block diagram illustrating an example, non-limiting embodiment of a PCN repeater system 240 functioning within the system 100 of FIG. 1 in accordance with various aspects described herein. According to the example PCN repeater system 240, a first base station 241a is in communication with a first virtual cellular controller 242a and a second base station 241b is in communication with a second virtual cellular controller 242b. The first and second virtual controllers 242a, 242b are in communication with each other via a private communications link 243 and adapted to provide wireless PCN service within a PCN service region 244. The first base station 241a communicates via at least one channel or wireless link 252a with one or more wireless communication devices, labeled as user equipment (UE) 245a, 245b, 245c, generally 245. Likewise, the second station 241b communicates via at least one other channel or other wireless link 252b with one or more of the UE 245.

In at least some embodiments, one or more of the UE 245 are mobile devices. Alternatively or in addition, one or more of the UE 245 may be stationary devices, e.g., as in an IoT applications in which the UE 245 may corresponds to an appliance or an architectural structure, substantially immobile and present at a fixed location. It is understood that at some times, at least some of the UEs 245 may be located within the PCN service region 244, while at other times, at least some of the UEs 245 may be located outside of the PCN service region 244. To an extent that the first UE 245 is located within the PCN service region 244, and authorized to access a PCN service available within the PCN service region 244, the first UE 245a may opt to access the PCN service, e.g., to access a PCN service 251 and/or to place a voice call to a second UE 245b located within the PCN service region 244. Alternatively or in addition, the first UE may opt to access another network, such as a public mobile network, instead of the PCN service, e.g., to access an external service 253 and/or to place a voice call to a third UE 245c that may not be authorized to access the PCN service and/or may not be located within the PCN service region 244.

To an extent that the first UE 245a opts to access a service or device outside of the PCN service, e.g., placing a voice call to the third UE 245c, the voice call may not be completed by the PCN service, instead being handled by the public cellular service alone or in combination with at least one of the virtual controllers 242. For example, the first UE 245a may initiate a voice call to the third UE 245c, by way of the second base station 241b and second virtual controller 242b. The second virtual controller 242b may detect that the third UE 245c of the called party is not an authorized user of the PCN service, and in response, facilitate a routing of the voice call traffic outside of the PCN service. In some embodiments, a call initiated via the PCN, by an authorized user device, to a call recipient outside of the PCN may be managed by a breakout gateway 250 in communication with at least one of the virtual controllers 242. Alternatively or in addition the requested call may be initiated by another network, such as a public mobile network. In the first instance, the authorized call initiator, i.e., the first UE 245a may communicate over the PCN to access a base station and/or a core network of the public mobile network.

The example call initiated via the PCN service may be established, routed and/or otherwise supported at least in party by the PCN, e.g., utilizing a wireless channel of the PCN for a local radio access network between the first UE 245a and the first base station 241a. For example, the second virtual controller 242b, having determined that the first UE 245a has requested and/or otherwise initiated a voice call to the third, unauthorized UE 245c, may route the call from the second base station to the third UE 245c via the public mobile network. Alternatively or in addition, the second virtual controller 242*b*, in response to determining the requested call and/or service is external to the PCN, may facilitate a transfer of supporting radio access network to the first UE 245*a*, e.g., from the PCN to another, public radio access network of the public mobile network. The other public radio access network may be supported from the same base station and/or from another base station providing overlapping wireless coverage of the public mobile network. In one instance, the air interface between the first UE 245*a* and the second base station 242*b* may utilize a frequency band associated with the PCN service, e.g., a CBRS channel and/or a licensed channel dedicated to support the PCN service. In another instance, the second virtual controller 242*b* and/or the second base station 241*b* may establish the call via another air interface of the public mobile network, e.g., using a licensed channel dedicated to support the public mobile network.

In at least some embodiments, a wireless communication device, e.g., the second UE 245*b*, may be authorized to access services via the PCN, via a public mobile network and/or via a combination of both the PCN and the public network. For example, the second UE 245*b* may include a first SIM and/or UICC 248 authorized to access a public mobile network and a second SIM and/or UICC 248 authorized to access the PCN. In at least some embodiments, the second UE 245*b* may include a controller 257 (shown in phantom) adapted to select between one or both of the available services. For example, the controller 257 may restrict and/or otherwise prioritize mobile usage via the PCN SIM 247, authorized for PCN access, at all times, or at least at times when a location of the second UE 245*b* is within the PCN service region 244. Alternatively or in addition, the controller 257 direct mobile service according to one or both of the SIMs and/or UICCs 247, 248 based on a policy and/or a rule. Such policies and/or rules may be based on one or more of a location of the second UE 245*b*, user credentials provided via the second UE 245*b*, a time of day, a user selection, and so on.

It is envisioned that in at least some scenarios, an authorized UE, such as the second UE 245*b*, may be located within the PCN service region 244, but unable to access the corresponding PCN service, e.g., due to insufficient signal strength, radio interference and/or wireless path blockage. According to the illustrative example, an obstruction 256, such as a combination of any one or more of a wall, a floor, furniture and/or persons, may block and/or otherwise hinder wireless communications between the second UE 245*b* and one or both of the base stations 241*a*, 241*b*, generally 241. The example PCN repeater system 240 includes at least one repeater 246*a*, 246*b*, generally 246, adapted to enhance access by the UE 245*b* located within the PCN service area to PCN services provided within the PCN service region 244. For example, a first repeater 246*a* is located within the PCN service region 244 and in wireless communication with one or more of the first and second base stations 241 via one or more of the wireless links 252. These wireless links 252 utilize one or more frequency bands licensed and/or unlicensed, e.g., CBRS, bands assigned to the corresponding PCN service. The first repeater 246*a* is in further communication with the second UE 245*b* via a supplemental wireless link 255*a*. The supplemental wireless link 255*a* may employ one or more of the licensed and/or unlicensed, frequency bands. In some embodiments, the supplemental wireless link 255*a* utilizes the same licensed and/or unlicensed frequency band as one or both of wireless links 252. Alternatively or in addition, the supplemental wireless link 255*a* utilizes a licensed and/or unlicensed frequency band that differs from one or both of the wireless links 252. Without limitation, the supplemental wireless link 255*a* may utilize an entirely different band. For example, in at least some embodiments, the supplemental wireless link 255*a* may utilize a LAN, such as a LAN subscribing to any one of the various IEEE 802.11 radio communication protocols, e.g., WiFi and/or BlueTooth.

It is envisioned that in at least some embodiments, multiple repeaters 246 may be utilized to extend PCN services within the PCN service region 244. In at least some embodiments, multiple repeaters may be utilized in a daisy-chain configuration. In at least some embodiments a repeater, e.g., a second repeater 246*b* operating as described above in relation to the first repeater 246*a* and extending PCN service in the PCN service region via another supplemental wireless link 255*b*, may be located outside of the PCN service region 244. For example, the second repeater 246*b* may be in communication with one or more of the virtual controllers 242 utilizing the same one or more antenna beams provided by the base station(s) 241. Alternatively or in addition, the second repeater 246*b* may be in communication with one or more of the virtual controllers 242 utilizing a different antenna beams and/or wireless link than those providing wireless coverage in the PCN service region 244.

By way of example, at least one of the repeater 246*a*, 246*b*, generally 246, may be deployed at a relatively fixed location. Such fixed location repeaters 246 may be hosted on and/or otherwise provided by a mobile cellular repeater, sometimes referred to as a cellular repeater, amplifier, or cell signal booster. Such repeaters may be installed inside buildings, to bring a signal from outdoors into the building, negating attenuation of the wireless signal caused by the building materials. In-building cell phone repeater systems typically use an outdoor donor antenna to transmit and receive signal from the nearest cellular signal. The outdoor antenna may be connected to an amplifier unit that amplifies the signal, retransmitting it locally via one or more indoor antennas, to provide improved signal strength inside the building.

Alternatively or in addition, PCN service coverage may be extended using one or more small cells. A small cell may be connected to one or more of the virtual controllers 242 using a backhaul. The backhaul may include a dedicated transmission line, or more likely, an "untrusted backhaul," such as "the Internet." Small cell devices may utilize a secure IPSEC tunnel to prevent any eavesdropping of PCN activity, such as calls and SMS messages. Examples of small cells may include, without limitation, metrocells, picocells and/or femtocells, generally known and distinguished by RF power ratings, coverage radius and/or capacity.

In at least some embodiments, one or more wireless communication devices of opportunity, such as one or more of the UE 245, may be utilized as a PCN coverage extender or repeater. This technique may be implemented similar to Wi-Fi hotspots in which a mobile user shares their mobile data connection, e.g., access to their PCN service, with others. Alternatively or in addition, the user device may share its local area coverage, e.g., a Wi-Fi connection, to which the UE is already connected, with other authorized devices, effectively extend your Wi-Fi coverage. For example, a UE 245 may install functionality, e.g., an application program or app, which facilitates operation of the UE 245 as a PCN extender and/or repeater. Such an app may run in a background manner, possibly without indication to the user, which would typically require some sort of user opt in beforehand.

Figure 2D:
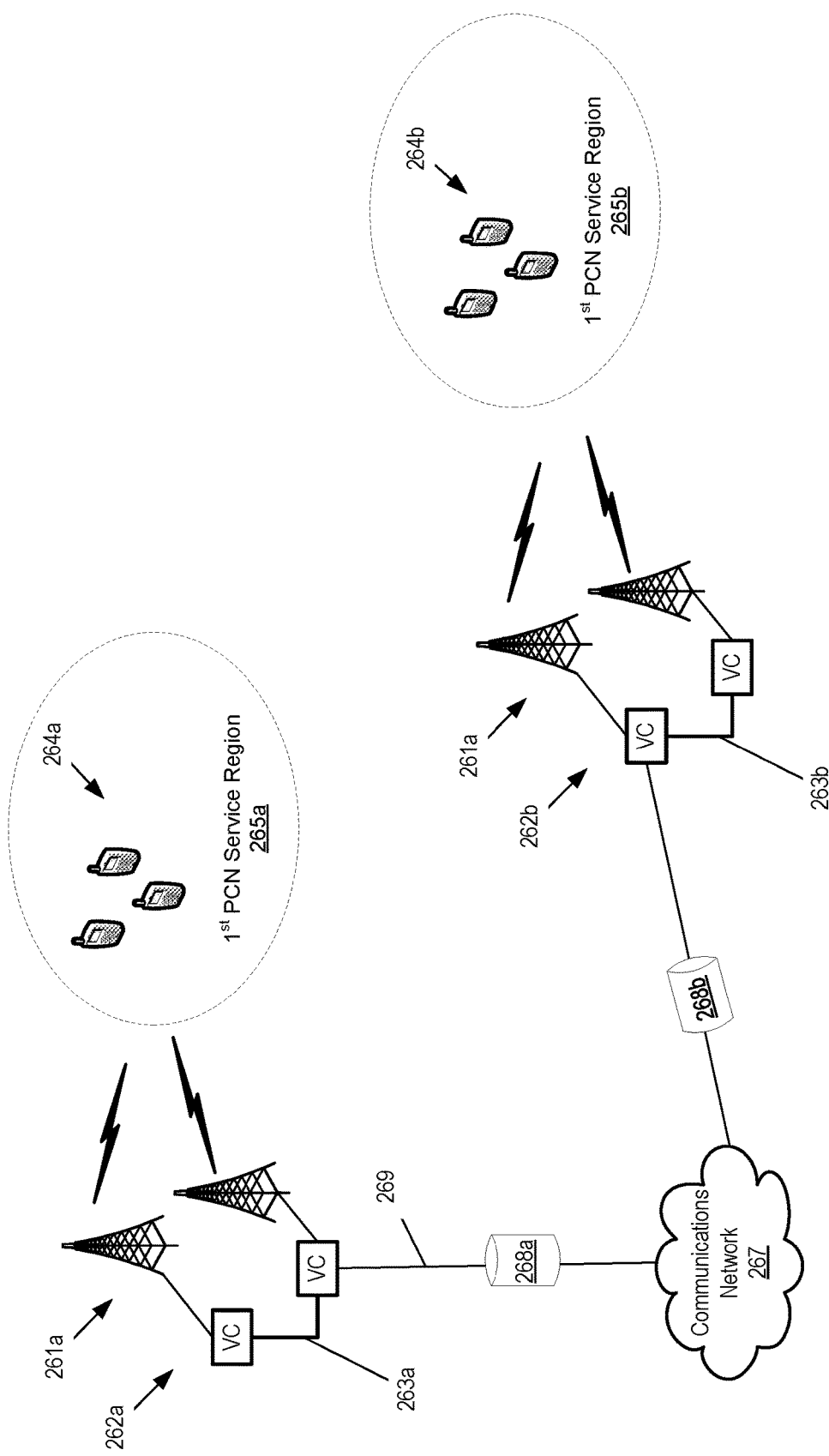
FIG. 2D is a block diagram illustrating an example, non-limiting embodiment of a geographically diverse PCN system functioning within the communication network of FIG. 1 in accordance with various aspects described herein.

FIG. 2D is a block diagram illustrating an example, non-limiting embodiment of a geographically diverse PCN system 260 functioning within the communication network of FIG. 1 in accordance with various aspects described herein. A first group of wireless access points 261a are in communication with a respective first group of virtual PCN controllers 262a. The virtual PCN controllers of the first group of virtual PCN controllers 262a are in communication with each other via a first controller link 263a. The first group of wireless access points 261a, in cooperation with the respective first group of PCN controllers 262a, provide a first wireless PCN service to a first group of UE devices 264a operating within the first PCN service area 265a. Likewise, a second group of wireless access points 261b are in communication with a respective second group of virtual PCN controllers 262b. The virtual PCN controllers of the second group of virtual PCN controllers 262b are in communication with each other via a second controller link 263b. The second group of wireless access points 261b, in cooperation with the respective second group of PCN controllers 262b, provide a second wireless PCN service to a second group of UE devices 264b operating within the second PCN service area 265b.

The first and second PCN service areas 265a, 265b may correspond to first and second campuses of a large business enterprise that operates multiple geographically diverse campuses, e.g., including campuses serviced by the first and second PCN service areas 265a, 265b. In at least some embodiments, it is advantageous to offer a coordinated, or effectively single PCN service to both of the first and second PCN service areas 265a, 265b. In this manner, a UE device of the first group of UE devices 264a may exchange information, e.g., voice calls and/or messages amongst other UE devices of the first group of UE devices 264a and/or the second group of UE device 264b, according to the PCN service, without being controlled by and/or having their control signaling and/or user data routed through a mobile core network of a mobile network operator.

In at least some embodiments, at least one virtual PCN controller of the first group of virtual PCN controllers 262a is in communication with at least one virtual PCN controller of the second group of PCN controllers 262b. For example, a virtual PCN controller of the first group of virtual PCN controllers 262a is in communication with a virtual PCN controller of the second group of virtual PCN controllers 262b via a remote communication link 269 that is at least partially accommodated by a communication network 267. In some embodiments, the communication network 267 may include a private network, such as a leased high-speed connection, e.g., fiber. Alternatively or in addition, at least a portion of the communication network 267 may include a public network, such as the Internet. In either instance, the remote communications link 269 may include a security feature, such as encryption, e.g., IPSEC, and/or tunneling, e.g., a VPN 268a, 268b, generally 268.

Figure 2E:
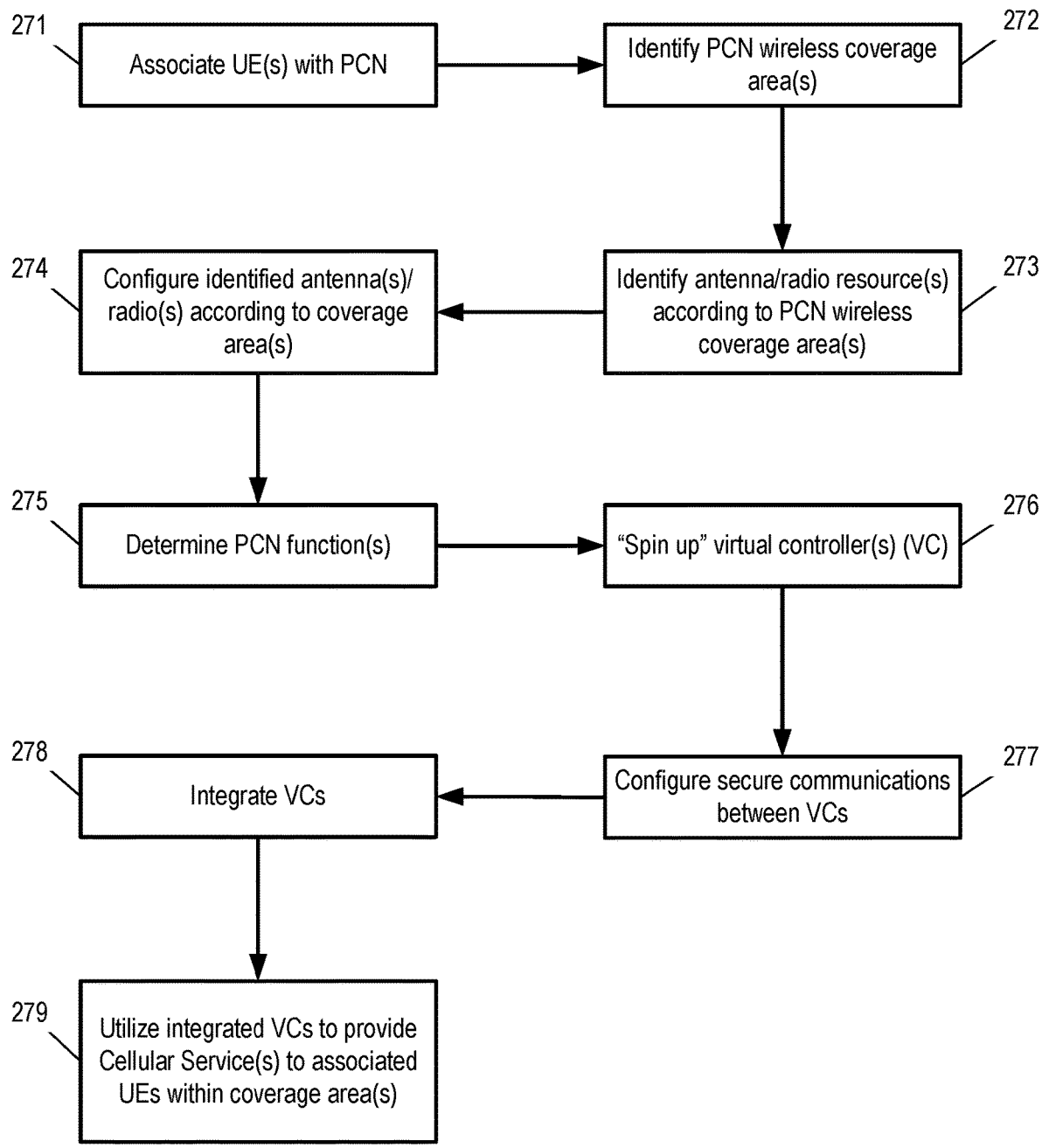
FIG. 2E depicts an illustrative embodiment of a virtual PCN as a service process in accordance with various aspects described herein.

FIG. 2E depicts an illustrative embodiment of a virtual PCN as a service process 270 in accordance with various aspects described herein. One or more wireless communication devices, e.g., UE(s), are associated with a PCN at 271. In at least some embodiments, access to a PCN and/or PCN services may be restricted and/or otherwise controlled. For example, a corporate PCN or a Government laboratory campus PCN, may restrict access to employees and/or to authorized users. Access to the PCN may be managed according to one or more of a user identity, e.g., a user identification number, such as an employee ID. Alternatively or in addition, access to the PCN may be managed according to an identity of a wireless communication device facilitating access to the PCN. Examples equipment identifiers may include SIM and/or UICC, device serial numbers, security tokens, and the like.

It is envisioned that a list of authorized users, e.g., authorized SIMS, may be established and used as a reference to determine whether a wireless communication device within a PCN service area is eligible to access the PCN. Alternatively or in addition, access may be further restricted, e.g., according to a username and/or password, biometric information, such as a fingerprint or facial recognition alone or in combination with any of the other access restrictions, including multifactor authentication.

A PCN wireless coverage area, sometimes referred to as a PCN service area, is identified at 272. In at least some embodiments, the PCN service area may be defined by a user requirement, e.g., a location and/or area covering one or more buildings, one or more sections of buildings, one or more particular floors of a building, an area that may or may not include a building, and the like. For example, the PCN service area may include particular metes and bounds of a campus as may be determined from a campus map. Alternatively or in addition, the PCN service area may be determined according to an address and an approximate size of a building and/or campus associated with the address, e.g., an area in square feet, e.g., a circle, a square, a rectangle, which may be centered upon and/or otherwise associated with the address.

Antenna/radio resource(s) may be identified according to PCN wireless coverage area(s) at 273. In at least some embodiments, the antenna and/or radio resources may include existing resources that may or may not be in service and supporting other communication services, such as public mobile cellular services. To the extent that existing resources are used, such resources would include a location, such as an antenna tower and/or building hosting an antenna installation. Likewise, such resources would also have associated operational frequency band capabilities, perhaps modulation types, coverage ranges, directional antenna patterns, e.g., azimuthal direction and/or azimuthal beamwidth and/or an elevation and/or elevation beamwidth. A resource provider, such as a mobile network operator, would most likely have such location, capability and/or coverage maps accessible in a resource database.

In at least some embodiments a resource owner may be provided with a PCN service request that includes one or more of a location, size and/or shape of a PCN service area. The service provider may compare information from the request to available resources to determine whether any resources may be capable of supporting the request. For example, one or more antennas may provide overlapping coverage to the requested PCN service area. Other resources may not cover any portion of the requested PCN service area, but may be configurable to provide such coverage. For example, an antenna may be adjusted to alter one or more of an azimuthal direction and/or beamwidth and/or elevation angle and/or beamwidth. At least some resources may be operating in one frequency band that is not conducive to the requested PCN service, but may be reconfigurable, e.g., returnable, to a frequency band. At least some resources may be capable of multi-band operation, e.g., licensed mobile cellular bands and/or a CBRS band. Information from the resource provider may be examined in view of the requested PCN service area and those resources capable of supporting the requested service identified as candidate resources.

In at least some embodiments, identification of the resources in consideration of a requested PCN service may automated, at least in part. For example, a PCN provisioning system and/or service may receive a request for PCN service, and determine from the request a corresponding PCN service area, e.g., as identified in the request, and/or determined from an address, entity identification and/or location determined from the request. The PCN provisioning system and/or service may next access a mobile network operator resource database to identify locations and/or other parameters of resources that may be utilized to provide the requested PCN service. The PCN provisioning system and/or service may compare locations and/or other parameters of mobile network operator resources to the requested PCN service area to determine if there may be any suitable candidates. To the extent suitable candidates are identified, a determination may be made as to whether sufficient resources are available to cover the requested PCN service area, and identification of any such resources. To the extent no resources are identified and/or that resources are only capable of coverage for a portion of the requested PCN service, a supplemental analysis may be performed.

The supplemental analysis may be implemented, at least in part, by the PCN provisioning system and/or service, by extending a request for resource information to another resource managing entity, such as another mobile network operator of a competitor. To the extent other resources may be identified to supplement any deficiencies in coverage, access to the resources may be coordinated so that the requested PCN service area may be provided by a combination of resources from more than one resource managing entity.

The identified antenna(s) and/or radio(s) may be configured, as necessary, according to coverage area(s) at 274. Configuration may include, without limitation, directing and/or redirecting antenna resources, allocating access to one or more operational frequency bands, including licensed frequency bands and/or shared bands, such as CBRS. Suitably configured antennas will provide coverage over an entirety of the requested PCN service area, and possibly to a somewhat larger area to ensure adequate coverage is provided in the requested area. Similarly, the suitably configured antennas and/or radios are adapted to provide coverage in one or more frequency bands allocated for the PCN services, with appropriate signal conditioning and so on.

It is envisioned that in at least some embodiments, resources allocated to support a PCN service may be dedicated to that service, e.g., to an exclusion of any non-authorized users and/or UE operating within and/or without the PCN service area. In at least some embodiments, at least some of the resources may be shared in such a manner that one resource may support PCN services, while also supporting another application, such as public mobile cellular service. Whether access to the resources is dedicated or shared, such access may be limited to a particular period of time, e.g., time of day, day of week, and/or a particular time slot of a time division multiple access scheme. Similarly, whether access to the resources is dedicated or shared, such access may be limited to a particular frequency band, such that an antenna and/or radio capable of supporting multiple bands, may do so in such a manner as to separate and/or otherwise isolate the requested PCN service form any other service, e.g., using any combination of filters, directional couplers, diplexers, and the like.

One or more PCN function(s) are identified at 275. PCN functions may be identified according to one or more of a particular request, e.g., a request for mobile devices vs. a request for appliances at a fixed location. The former may require mobility functions, whereas the latter may not. Alternatively or in addition, PCN functions may be identified according to a class of service, a level of subscription, a category and/or type of authorized devices, a user identity, a user request, and so on. At least some group of PCN functions may be identified as a minimum set required for virtually any application, while other groups of PCN functions may be identified for particular applications, e.g., voice traffic, message traffic, streaming media, and so on.

One or more PCN controllers are configured at 276. The PCN controllers may be configured according to one or more of locations and/or types of identified antenna and/or radio resources that will support the requested PCN service. In some embodiments, one PCN controller may be configured for each allocated antenna and/or radio. In at least some embodiments, at least some of the allocated antenna and/or radio resources may share one of the PCN controllers. It is envisioned that in at least some embodiments, the PCN controllers may be provisioned as virtual machines, being referred to as virtual PCN controller(s), or simply virtual controllers (VC) at 276.

To the extent any VCs are utilized, they may be instantiated, configured and/or otherwise "spun up" based on a requirement that may be driven at least in party by one or more of the requested PCN service and/or particulars of any allocated antenna and/or radio resources. Other considerations when configuring the VCs may include an identity and nature of the PCN user, e.g., inferring a security level and/or minimum latency requirement that may impact an architecture of allocated infrastructure and/or configured VCs.

To the extent VCs are instantiated, they may be hosted on servers that may be local to the allocated antenna and/or radio resources, e.g., at or near a base station, perhaps in an equipment cabinet or closet. Alternatively or in addition, the VCs may be hosted on servers located elsewhere, such as one or more datacenters, and/or third party cloud services. In some embodiments, VCs may be hosted on shared servers, while in other embodiments, VCs may be hosted on dedicated servers, e.g., to provide greater security.

Communications between the suitably configured PCN controllers, e.g., a VC link between VCs, may be established at 277. Communications between the VCs may be established using a dedicated circuit, e.g., via a landline, a coaxial cable and/or fiber extending between one or more of the configured VCs. Alternatively or in addition, communications between the VCs may be established using a network, such as a private network, a local area network and/or a wide area network, such as the Internet. To the extent the VC link is shared with entities other than those authorized for PCN access and/or to the extent the VC link exits a secure facility, the link may be secured. Security of the link may include any form of physical security, e.g., access restriction, encryption and/or secure tunneling.

To the extent multiple PCN controllers are utilized, they may be configured in support of a common PCN service area, and integrated at 278 to form an integrated PCN controller. To the extent that the multiple cooperating PCN controllers are VCs, they may be integrated as a single virtual integrated controller (VICs). It is envisioned that in at least some embodiments, each of the cooperating PCNs may be conjured with a complete set of PCN functions, such that a single VC may be capable of providing a PCN service, such as voice calling and/or messaging, without the assistance of another VC. Alternatively or in addition, at least some of the PCN functions may be shared across more than one of the cooperating PCN controllers to reduce duplication, system complexity, and possibly installation and/or operation and maintenance costs.

The integrated PCN controllers, e.g., VCs, may be configured and/or otherwise operated at 279 to provide PCN service to authorized users and/or UE devices located within the PCN service area. Services may include, without limitation, any one or more service as may be common to cellular mobile network, such as voice service, messaging service, data service, streaming media service, mobility service, and so on.

Figure 2F:
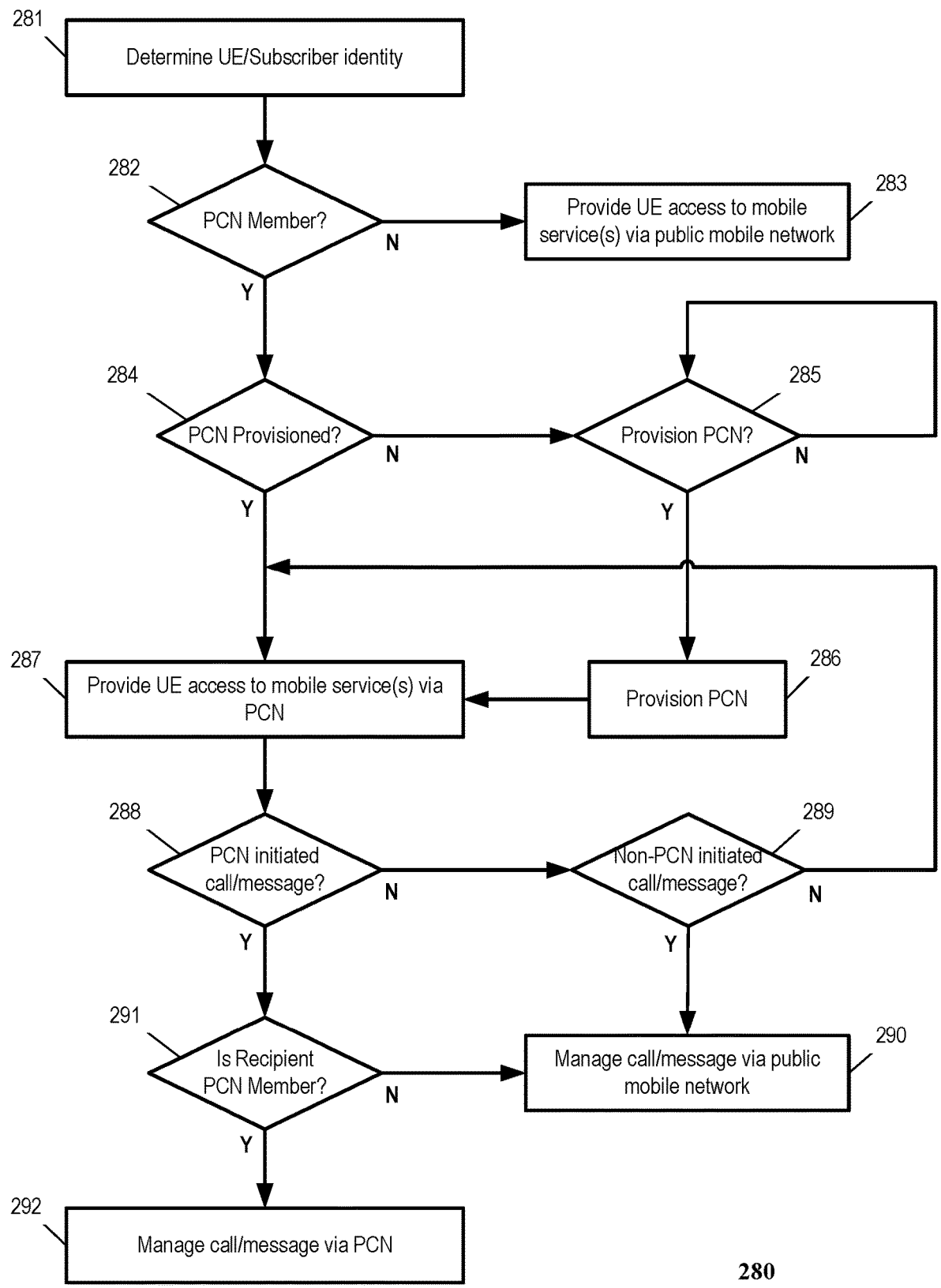
FIG. 2F depicts an illustrative embodiment of a virtual PCN as a service process in accordance with various aspects described herein.

FIG. 2F depicts an illustrative embodiment of a virtual PCN as a service process 280 in accordance with various aspects described herein. A UE device and/or subscriber identity is determined at 281. For example, the UE identity may be determined according to a message provided by the UE that includes an identification of its SIM. A determination is made at 282 as to whether an identified subscriber and/or UE is an authorized user and/or device. Identities of authorized users and/or devices may be provided by a PCN user, e.g., an employer, business owner, Government agency. In at least some instances authorized individuals are provided with a UE device include a pre-authorized SIM card. Alternatively or in addition, an authorized individual may be provided with a pre-authorized SIM card to be installed within a UE device, such as an employee's personal mobile phone.

To the extent it is determined at 282 that the identified user and/or UE device is not an authorized PCN member, access by the user and/or UE device may be blocked and/or otherwise provided at 283 via a non-PCN service, such as a public mobile network. To the extent it is determined at 282 that the identified user is a PCN member, a further determination may be made at 284 as to whether a corresponding PCN has been provisioned. To the extent it is determined at 284 that a corresponding PCN has not been provisioned, a further determination may be made at 285 as to whether a PCN should be provisioned. To the extent it is determined at 285 that a PCN should not yet be provisioned, the process 270 may continue from testing at 285 as to whether a PCN should be provisioned.

To the extent it is determined at 285 that a PCN should be provisioned, proceed to provision the PCN at 286. In at least some embodiments, a PCN may be provisioned and/or otherwise configured according to one or more authorized PCN subscribers and/or UE devices. For example, a business enterprise may have subscribed for a PCN that provide a PCN service to a primary location of the business, e.g., at a corporate building and/or campus. The PCN service may be provisioned according to any of the example techniques disclosed herein that utilize at least some existing mobile network operator resources, e.g., antennas and/or radios, wireless access points and/or base stations, and configuring PCN controllers that extend the PCN service without handling and/or otherwise routing PCN message traffic through a public mobile core network. According to this scenario, employees may be provided with UE devices and/or SIM cards that are identified as authorized users, permitting access to the PCN service while present within a provisioned PCN service region, e.g., at the primary business location.

However, in some instances, a group of employees may depart the primary business location to another common location, e.g., to attend an off-site meeting at another location, not previously identified for PCN services. In such instances, a mobile network operator may track locations and identities of authorized devices, even while roaming outside of preconfigured PCN service areas. Certain policies and/or rules may be applied by the PCN service provider to recognize a group of employees that are offsite, yet proximate to each other. A triggering number of employees to determine whether a PCN extension service area should be provided, may be determined according to a threshold number of employees. The threshold number may be more than one, or more than some other predetermined number, e.g., three, five, ten, and so on. Alternatively or in addition, a predetermined threshold proximity may also be established, e.g., within 100 feet, 500 feet, 1,000 feet, and so on.

Accordingly, when a triggering number of employees is present within a predetermined proximate area, the PCN service provider may provision an extended PCN to provide coverage to the group. The extended PCN service may provide service within an extended PCN service area that covers the proximate area and, in at least some embodiments, a greater area that may be based on the proximate area, e.g., doubled, quadrupled, or set to some other area, such as a minimum coverage area, and/or a predetermined coverage area of a group of hierarchical coverage areas that includes the proximate area.

In at least some embodiments, such an extension of PCN service to a remote region may exist for a predetermined time period, e.g., for one hour, one day, and so on, perhaps based on a user selection and/or based on historical patterns of pervious extended PCN service, possibly incorporating machine learning and/or AI. It is further envisioned that the extended PCN provisioning process being repeated periodically, such that another PCN extension may be provisioned should the group of employees remain within the proximate area beyond some service time period. Alternatively or in addition, the extended PCN service may be suspended and/or otherwise terminated should the number of employees within the proximate area drop below a minimum triggering number of employees, i.e., below a suspension and/or de-provisioning threshold number of users. In at least some embodiments a delay may be provided to account for momentary departures of a user or users from the extended PCN service area and/or for a power cycling of participating UE devices. Alternatively or in addition, a different proximity threshold may be established for suspension and/or decommissioning, e.g., being greater than the extended PCN service area, to provide some elasticity to account for user mobility and/or signal blockage.

It is envisioned that in at least some embodiments, further rules may restrict initiation of an extended PCN service. For example, certain locations, such as a competitor's facility, certain public facilities or venues, certain territorial restrictions as may be determined according to range, geographic boundaries and/or geopolitical boundaries. Accordingly, even if a sufficient number of authorized users are present withing a predetermined proximity, initiation of an extended PCN service may be blocked and/or otherwise prevented.

It is further envisioned that in at least some embodiments, the triggering number of employees may be a single employee. Consider an employee on a business trip to some remote destination. Should the employee require access to the PCN service, e.g., for security reasons, an extended PCN may be initiated for the single employee to provide them with access.

In at least some embodiments, an opportunity for generating an extended service may be identified and presented in an offer. The offer may be presented to one or more of the remote group of proximate users and/or some other managing entity, such as an employee's manager, admin, and/or corporate IT. This accounts for situations in which an extended PCN may not be authorized and/or otherwise necessary. Alternatively or in addition, such extended PCN service areas may be initiated upon request, e.g., by an authorized user, a PCN subscribing entity. For example, the employee on an extended business trip may require access to a home PCN service. An extended PCN service area may be established according to the request. The request may include one or more of a location, an extended service area, a start time and/or date and/or a termination time and/or date. It is understood that for any of the aforementioned extended PCN service areas, any PCN controllers, e.g., VCs, may be in communication with PCN controllers of a home PCN service area and/or perhaps other extended PCN services as may exist at any given time.

After provisioning the PCN, e.g., to provide an extended PCN service area, proceed to provide the UE and/or any other UEs within the provisioned service area with access at 287 to mobile service(s) via the extended PCN. To the extent it is determined at 284 that a corresponding PCN has already been provisioned, e.g., a PCN service covering the example primary business location and/or a previously provisioned extended PCN service area discussed above, proceed to provide the UE with access at 287 to mobile services via the PCN. PCN services may include any service otherwise available via mobile cellular network service plans, such as voice calls, messaging, Internet access, streaming media, and so on. Beneficially, such mobile network level services are provided by the PCN offering heightened security and improved responsiveness, e.g., reduced latency, dropped calls, download stalls, and the like.

A determination is made at 288 as to whether an authorized UE initiated a call and/or a message via the PCN. To the extent it is determined at 288 that the authorized UE did not initiate a call and/or a message via the PCN, a further determination is made at 289 as to whether the authorized UE initiated a non-PCN call and/or a message. It is understood that an authorized UE may attempt to place a call, send a message and/or otherwise communicate with an entity outside of the PCN. Such attempts may be recognized by a PCN controller according to a recipient address in a message and/or a called number. The recipient identity and/or called number may be compared to a list of authorized PCN users to decide as to whether the call and/or message may be processed within the PCN.

It is envisioned that in at least some embodiments, authorized UEs may be restricted to communications with the PCN. Accordingly, any attempts to place a call, send a message and/or otherwise access external resources, may be blocked by policies and/or rules imposed by the PCN. Similarly, authorized UE may be configured to inhibit and/or otherwise block or restrict access to communication resources outside of the PCN. Accordingly, any restricted UE may be prevented from attachment to any mobile network other than the authorized PCN. In at least some embodiments, restrictions may be extended to WiFi and/or Ethernet connections, preventing all and/or some selected level of external access.

In at least some embodiments, a UE device with an authorized SIM may be allowed to place and/or receive an external call and/or message and/or otherwise communicate with external entities other than those associated with the PCN. In such instances, a remote outgoing and/or incoming call and/or message may be permitted. Such permissions may be granted according to external communication rules and/or policies, e.g., permitting external communications to a pre-approved white list of entities and/or restricting external communications to a predetermined black list of entities. Alternatively or in addition, such external communications may be approved and/or denied on a per call and/or per message basis.

Alternatively or in addition, an authorized UE device may include one SIM to access PCN services and another SIM for public mobile network services. In this regard, the appropriate SIM may be selected by a user and/or automatically, so that any calls or messages internal/external PCN entities may be handled accordingly.

To the extent it is determined at 289 that the authorized UE did not initiate either a PCN or a non-PCN call at 288 and 289, continue to provide the authorized UE with access at 287 to mobile service(s) via the PCN, monitoring for possible future calls at 286 and 287. However, to the extent it is determined at 289 that the authorized UE did initiate a non-PCN call and/or a message, proceed to manage at 290 the non-PCN call and/or a message via a non PCN network. Similarly, to the extent it is determined at 288 that the authorized UE did request initiation of a call and/or a message via the PCN, determine at 291 whether a target UE, being an intended recipient of the requested call/message, is an authorized UE of the PCN. To the extent it is determined at 291 that the target UE is not an authorized UE of the PCN, proceed to manage at 290 the requested call and/or message as a non-PCN call.

To the extent it is determined at 291 that the target UE is an authorized UE of the PCN, proceed to manage at 292 the requested call and/or message as a PCN call.

While for purposes of simplicity of explanation, the respective processes are shown and described as a series of blocks in FIGS. 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of the system 100, the subsystems and functions of the virtual PCN system 200, the virtual integrated controller system 220, the PCN repeater system 240, the geographically diverse PCN system 260 and processes 270, 280 presented in FIGS. 1, 2A, 2B, 2C, 2D, 2E, 2F and 3. For example, virtualized communication network 300 can facilitate in whole or in part configuring one or more antennas of a public mobile cellular network to provide dedicated wireless coverage to a private service area and for instantiating one or more virtual controllers in communication with the one or more antennas. The virtual controller(s) are adapted to provide PCN service to authorized wireless communication devices operating within the private service area without utilizing core network resources of the public mobile cellular network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

The example virtualized communication network 300 may include one or more VCs 382a, 382b, generally 182, supported by the virtualized network function cloud 235 and/or via other cloud computing environments 375. In at least some embodiments the virtualized communication network 300 also includes a PCN controller 380. The PCN controller 380 may also be supported by the virtualized network function cloud 235 and/or via other cloud computing environments 375. The VCs 283 may provide PCN controller functionality in association with PCN services to an authorized PCN service area. Coordination, instantiation, operation and/or maintenance of the VCs 382 may be facilitated by the PCN controller 380. Alternatively or in addition, the PCN controller 380 may implement one or more rules and/or policies in association with a provisioning and/or operation of a PCN service. In at least some embodiments, the PCN controller 382 is adapted to detect, initiate, termination and/or otherwise manage one or more PCN services, and/or PCN service areas, including extended PCN service areas.

Figure 4:
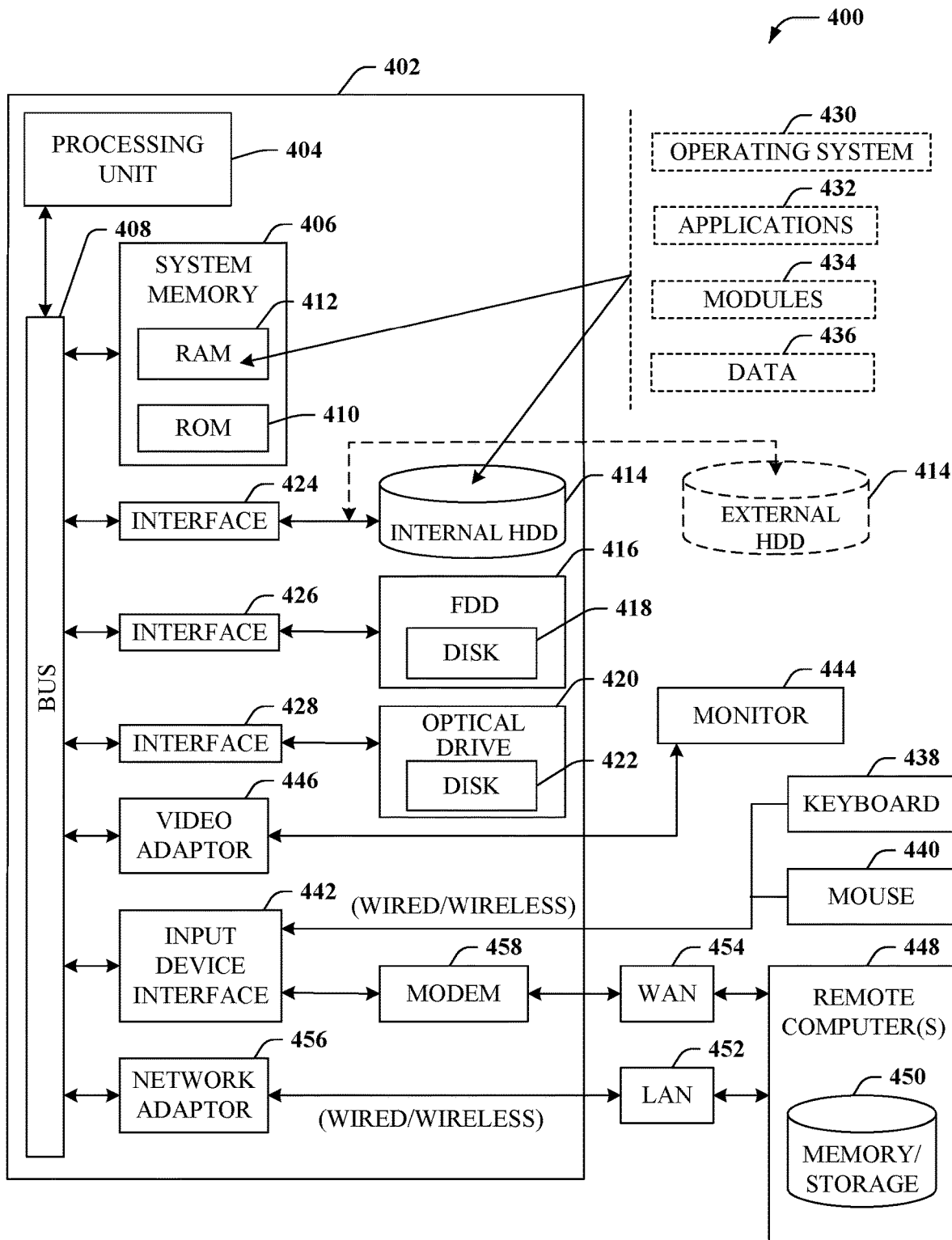
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part configuring one or more antennas of a public mobile cellular network to provide dedicated wireless coverage to a private service area and for instantiating one or more virtual controllers in communication with the one or more antennas. The virtual controller(s) are adapted to provide PCN service to authorized wireless communication devices operating within the private service area without utilizing core network resources of the public mobile cellular network.

Generally, program modules comprise routines, programs, components, data structures, etc., that perform particular tasks or implement particular abstract data types.

Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
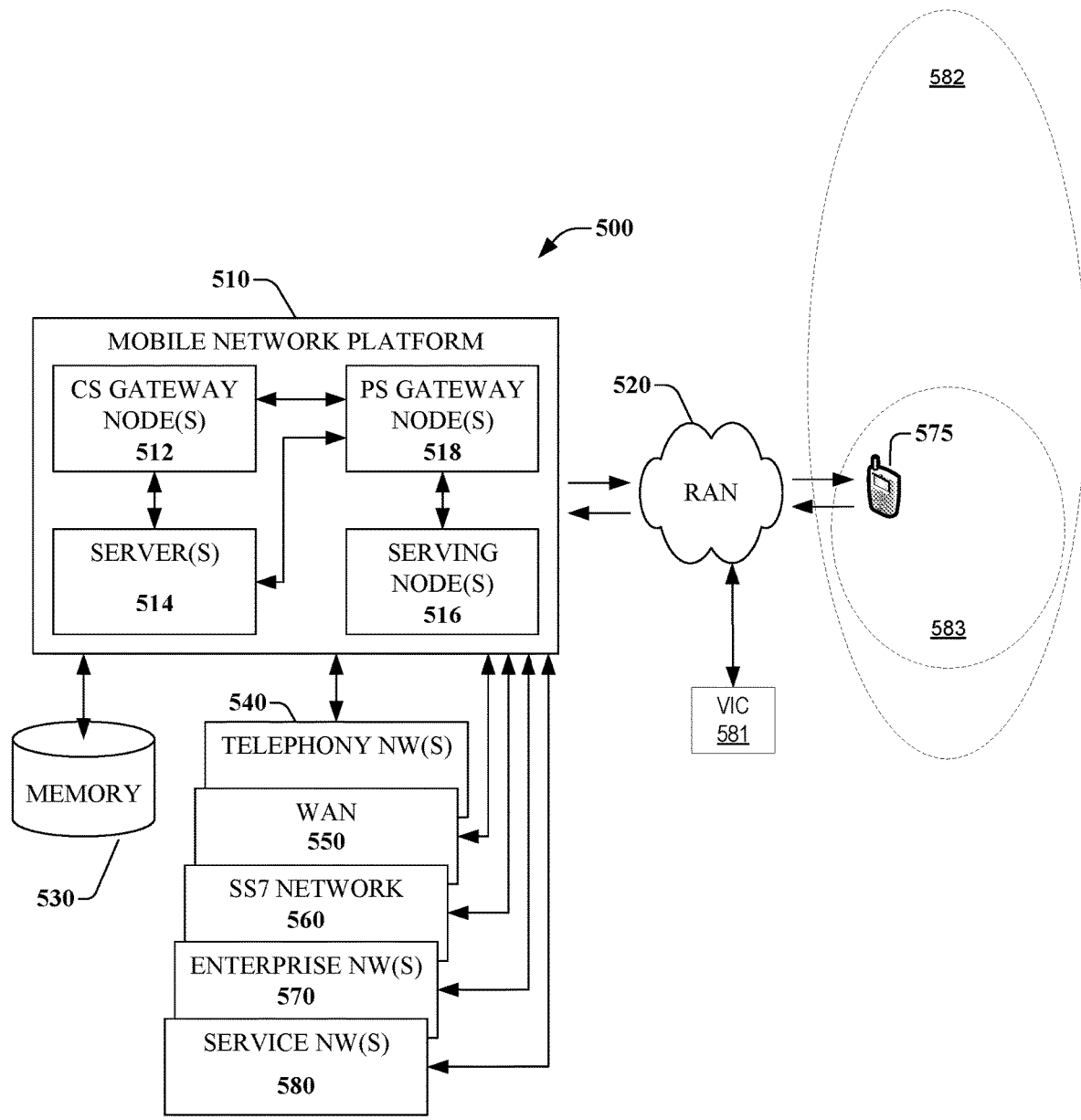
FIG. 5 is a block diagram of an example, non-limiting embodiment of a mobile network platform in accordance with various aspects described herein.

Turning now to FIG. 5, an embodiment of a mobile communication system 500 including a mobile network platform 510 is shown that is an example of network elements 150, 152, 154, 156, and/or VNEs 330, 332, 334, etc. For example, platform 510 can facilitate in whole or in part configuring one or more antennas of a public mobile cellular network to provide dedicated wireless coverage to a private service area and for instantiating one or more virtual controllers in communication with the one or more antennas. The virtual controller(s) are adapted to provide PCN service to authorized wireless communication devices operating within the private service area without utilizing core network resources of the public mobile cellular network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

The example mobile communication system 500 may be adapted to provide public mobile network service to a public network service area 582. Alternatively or in addition, the example mobile communication system 500 may be adapted to provide PCN service to a PCN service area 583. In this regard, the example mobile communication system 500 further include a virtual integrated controller 581 adapted to provide PCN services to authorized UE devices 575 operating within the PCN service area 583.

Figure 6:
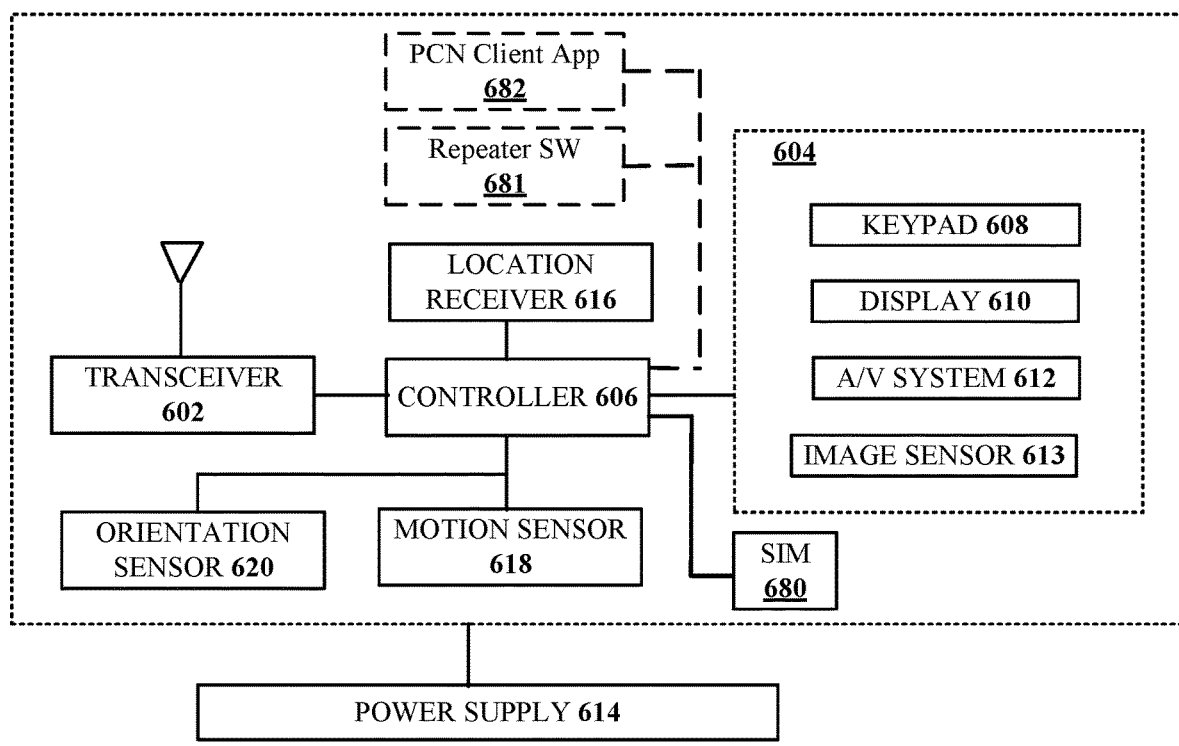
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part configuring one or more antennas of a public mobile cellular network to provide dedicated wireless coverage to a private service area and for instantiating one or more virtual controllers in communication with the one or more antennas. The virtual controller(s) are adapted to provide PCN service to authorized wireless communication devices operating within the private service area without utilizing core network resources of the public mobile cellular network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In at least some embodiments, the communication device 600 includes a SIM 680 that may be associated with and/or dedicated for exclusive use with a PCN service. Alternatively or in addition the example communication device 600 may contain one or more of a PCN client executable instructions and/or software, e.g., in a form of a PCN client application 682. The PCN client application 682 may facilitate any one or more of the various techniques disclosed herein, including provision of user prompts, user alerts, and/or accepting user inputs, such as requests and/or management of extended PCN services.

In at least some embodiments the communication device 600 may include repeater executable instructions and/or software 681. Such repeater software 682 may facilitate a role of the communication device 600 as a PCN repeater, e.g., extending a PCN service area and/or filling in gaps of PCN service area coverage.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   associating, by a processing system including a processor, a plurality of wireless communication devices with a private cellular network group;
   identifying, by the processing system, a first service area to receive a private cellular network service;
   directing, by the processing system, a radio access network (RAN) of a plurality of RANS in communication with a mobile core network of a publicly accessible mobile cellular network to obtain a first directed RAN that provides a first wireless coverage area overlapping at least a portion of the first service area; and
   configuring, by the processing system, a first virtual machine as a first private cellular network controller, wherein the first private cellular network controller is adapted to provide the private cellular network service, via the first directed RAN, to a first wireless communication device of the private cellular network group operating within the first service area, wherein the private cellular network service does not utilize the mobile core network.

2. The method of claim 1, wherein the RAN comprises an antenna and a radio transceiver, the antenna being in communication with the radio transceiver,
   wherein the first virtual machine is distinct from the mobile core network, and
   wherein the directing the RAN further comprises:
   reconfiguring, by the processing system, one of the antenna, the radio transceiver, or a combination of the antenna and the radio transceiver.

3. The method of claim 1, further comprising:
   coordinating, by the processing system, access to a frequency band of an unlicensed, citizens broadband radio service (CBRS) to obtain a coordinated CBRS frequency band, wherein the first private cellular network controller is adapted to provide the private cellular network service to the first wireless communication device of the private cellular network group via the coordinated CBRS frequency band.

4. The method of claim 3, wherein the first directed RAN is configurable to operate in an unlicensed CBRS frequency band, a licensed long term evolution (LTE) frequency band, a licensed 5G frequency band, or any combination thereof.

5. The method of claim 1, wherein the private cellular network service comprises voice service, messaging service, Internet service, streaming media service or any combination thereof.

6. The method of claim 1, wherein the first private cellular network controller is dedicated to restrict access to the private cellular network service to the plurality of wireless communication devices of the private cellular network group.

7. The method of claim 1, further comprising:
   configuring, by the processing system, a wireless repeater that, when positioned within the first wireless coverage area, is adapted to extend access to the private cellular network service to the first wireless communication device operating beyond the first wireless coverage area.

8. The method of claim 1, further comprising:
   determining, by the processing system, a second service area comprising a first location of the first wireless communication device and a second location of a second wireless communication device of the private cellular network group, wherein the second service area is geographically separated from the first service area;
   directing, by the processing system, a second RAN of the plurality of RANs of the publicly accessible mobile cellular network to obtain a second directed RAN that provides a second wireless coverage area overlapping at least a portion of the second service area; and
   configuring, by the processing system, a second virtual machine as a second private cellular network controller in communication with the first private cellular network controller, wherein the second private cellular network controller is adapted to extend the private cellular network service, via the second directed RAN, to the first and second wireless communication devices, without utilizing the mobile core network.

9. The method of claim 1, further comprising:
   identifying, by the processing system, a second service area to receive the private cellular network service, wherein the first and second service areas are geographically diverse and non-overlapping;
   directing, by the processing system, a second RAN of the plurality of RANs of the publicly accessible mobile cellular network to obtain a second directed RAN that provides a second wireless coverage area; and
   configuring, by the processing system, a second virtual machine as a second private cellular network controller, wherein the second private cellular network controller is adapted to provide the private cellular network service, via the second directed RAN, to a second wireless communication device of the private cellular network group operating within the second service area, without utilizing the mobile core network.

10. The method of claim 9, wherein the first and second private cellular network controllers are in communication with each other and adapted to securely exchange communications of the plurality of wireless communication devices therebetween, without routing the communications through the mobile core network.

11. The method of claim 1, further comprising:
    tracking, by the processing system, movement of the plurality of wireless communication devices;
    adjusting, by the processing system, a spatial configuration of the first service area responsive to the tracking of the movement to obtain a first adjusted service area; and
    redirecting, by the processing system, a first antenna of the first RAN to obtain a first redirected antenna that provides an adjusted first wireless coverage area overlapping at least a portion of the first adjusted service area, to provide the private cellular network service to the first adjusted service area via the first redirected antenna.

12. The method of claim 1, wherein the identifying of the first service area further comprises:
    determining, by the processing system, device locations of the plurality of wireless communication devices of the private cellular network group to obtain determined device locations; and identifying, by the processing system, a proximate group of the plurality of wireless communication devices according to the determined device locations, wherein the directing of the first RAN is responsive to a number of devices of the proximate group of the plurality of wireless communication devices exceeding a threshold value.

13. A system, comprising:
a processing system including a processor; and
a memory that stores executable instructions that, when executed by the processing system, facilitate performance of operations, the operations comprising:
associating a plurality of wireless communication devices with a private cellular network group;
identifying a first service area to receive a private cellular network service, wherein the private cellular network service comprises voice service, messaging service, Internet service, streaming media service or any combination thereof;
directing a radio access network (RAN) of a plurality of RANS in communication with a mobile core network of a publicly accessible mobile cellular network to obtain a first directed RAN that provides a first wireless coverage area overlapping at least a portion of the first service area; and
configuring a first virtual machine as a first private cellular network controller, wherein the first private cellular network controller is adapted to provide the private cellular network service, via the first directed RAN, to a first wireless communication device of the private cellular network group operating within the first service area, wherein the private cellular network service does not utilize the mobile core network, and wherein the first private cellular network controller is dedicated to restrict access to the private cellular network service to the plurality of wireless communication devices of the private cellular network group.

14. The system of claim 13, wherein the RAN comprises an antenna and a radio transceiver, the antenna being in communication with the radio transceiver,
wherein the first virtual machine is distinct from the mobile core network, and
wherein the directing the RAN further comprises:
reconfiguring one of the antenna, the radio transceiver, or a combination of the antenna and the radio transceiver.

15. The system of claim 13, wherein the operations further comprise:
coordinating access to a frequency band of an unlicensed, citizens broadband radio service (CBRS) to obtain a coordinated CBRS frequency band, wherein the first private cellular network controller is adapted to provide the private cellular network service to the first wireless communication device of the private cellular network group via the coordinated CBRS frequency band.

16. The system of claim 15, wherein the first directed RAN is configurable to operate in an unlicensed CBRS frequency band, a licensed long term evolution (LTE) frequency band, a licensed 5G frequency band, or any combination thereof.

17. A non-transitory, machine-readable medium, comprising executable instructions that, when executed by a processing system including a processor, facilitate performance of operations, the operations comprising:
associating a plurality of wireless communication devices with a private cellular network group;
identifying a first service area to receive a private cellular network service;
directing a radio access network (RAN) of a plurality of RANS in communication with a mobile core network of a publicly accessible mobile cellular network to obtain a first directed RAN that provides a first wireless coverage area overlapping at least a portion of the first service area;
configuring a first virtual machine as a first private cellular network controller, wherein the first private cellular network controller is adapted to provide the private cellular network service, via the first directed RAN, to a first wireless communication device of the private cellular network group operating within the first service area, wherein the private cellular network service does not utilize the mobile core network, and wherein the first private cellular network controller is dedicated to restrict access to the private cellular network service to the plurality of wireless communication devices of the private cellular network group; and
configuring a wireless repeater that, when positioned within the first wireless coverage area, is adapted to extend access to the private cellular network service to the first wireless communication device operating beyond the first wireless coverage area.

18. The non-transitory, machine-readable medium of claim 17, wherein the operations further comprise:
identifying a second service area to receive the private cellular network service, wherein the first and second service areas are geographically diverse and non-overlapping.

19. The non-transitory, machine-readable medium of claim 18, wherein the operations further comprise:
directing a second RAN of the plurality of RANs of the publicly accessible mobile cellular network to obtain a second directed RAN that provides a second wireless coverage area.

20. The non-transitory, machine-readable medium of claim 19, wherein the operations further comprise:
configuring a second virtual machine as a second private cellular network controller, wherein the second private cellular network controller is adapted to provide the private cellular network service, via the second directed RAN, to a second wireless communication device of the private cellular network group operating within the second service area, without utilizing the mobile core network.

\* \* \* \* \*